(12) United States Patent
Chen et al.

(10) Patent No.: US 9,277,228 B2
(45) Date of Patent: Mar. 1, 2016

(54) ADAPTATION PARAMETER SETS FOR VIDEO CODING

(75) Inventors: Ying Chen, San Diego, CA (US); In Suk Chong, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/548,742

(22) Filed: Jul. 13, 2012

(65) Prior Publication Data

US 2013/0022104 A1 Jan. 24, 2013

Related U.S. Application Data

(60) Provisional application No. 61/509,015, filed on Jul. 18, 2011, provisional application No. 61/511,477, filed on Jul. 25, 2011, provisional application No. 61/540,907, filed on Sep. 29, 2011.

(51) Int. Cl.
| | |
|---|---|
| *G06K 9/36* | (2006.01) |
| *H04N 7/12* | (2006.01) |
| *H04B 1/66* | (2006.01) |
| *H04N 19/174* | (2014.01) |
| *H04N 19/70* | (2014.01) |
| *H04N 19/46* | (2014.01) |
| *H04N 19/61* | (2014.01) |

(52) U.S. Cl.
CPC ............. *H04N 19/174* (2014.11); *H04N 19/46* (2014.11); *H04N 19/61* (2014.11); *H04N 19/70* (2014.11)

(58) Field of Classification Search
CPC ............. H04N 7/32; H04N 3/10; H04N 7/24; H04N 7/12; H04B 1/66

USPC ................ 375/240.13, 240.12; 348/305, 550; 725/25

See application file for complete search history.

(56) References Cited

U.S. PATENT DOCUMENTS

| | | | |
|---|---|---|---|
| 6,181,742 B1 * | 1/2001 | Rajagopalan et al. | ........ 375/240 |
| 7,751,628 B1 | 7/2010 | Reisman | |
| 7,852,919 B2 | 12/2010 | Crinon et al. | |
| 2004/0047423 A1 * | 3/2004 | Viscito et al. | ............ 375/240.26 |

(Continued)

FOREIGN PATENT DOCUMENTS

TW 201116066 A 5/2011

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

(Continued)

*Primary Examiner* — Sath V Perungavoor
*Assistant Examiner* — Patricia I Young
(74) *Attorney, Agent, or Firm* — Shumaker & Sieffert, P.A.

(57) ABSTRACT

In one example, a video decoder is configured to store an adaptation parameter set (APS) data structure in a buffer of a coding device, wherein the APS data structure includes signaling data applicable to one or more slices of video data, decode at least one of the slices based on the signaling data of the APS data structure, after decoding the slice, determine that the APS data structure can be removed from the buffer, remove the APS data structure from the buffer based on the determination, and decode one or more additional slices of the video data after removing the APS data structure from the buffer.

45 Claims, 6 Drawing Sheets

(56) References Cited

U.S. PATENT DOCUMENTS

| | | | |
|---|---|---|---|
| 2005/0099869 A1 | 5/2005 | Crinon et al. | |
| 2006/0159352 A1 | 7/2006 | Ishtiaq et al. | |
| 2009/0003447 A1 | 1/2009 | Christoffersen et al. | |
| 2009/0316774 A1* | 12/2009 | Yang et al. | 375/240 |
| 2010/0158103 A1 | 6/2010 | Ye et al. | |
| 2012/0230405 A1 | 9/2012 | An et al. | |

OTHER PUBLICATIONS

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Wiegand et al.,"WD1: Working Draft 1 of High-Efficiency Video Coding", Joint Collaborative Team on Video Coding, JCTVC-C403, Oct. 7-15, 2010, 137 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD2: Working Draft 2 of High-Efficiency Video Coding", Joint Collaborative Team on Video Coding, JCTVC-D503, Jan. 20-28, 2011, 153 pp.

Wenger et al., "Adaptation Parameter Set (APS)", Joint Collaborative Team on Video Coding, JCTVC-F747r3, Jul. 14-22, 2011, 10 pp.

Bross et al., "High efficiency video coding (HEVC) text specification draft 6," 8th Meeting: San Jose, CA, USA, Feb. 1-10, 2012, JCTVC-H1003, 259 pp.

Hannuksela, "Coding of Parameter Sets", JVT Meeting; 60. MPEG Meeting; Jun. 5, 2002-Oct. 5, 2002; Fairfax,US; (Joint Video Team of ISO/IEC JTC1/SC29/WG11 and ITU-TSG.16 ), No. JVT-0078, XP030005187, 14 pp.

International Preliminary Report on Patentability—PCT/US2012/046895, The International Bureau of WIPO—Geneva, Switzerland, Jan. 30, 2014, 10 pp.

International Preliminary Report on Patentability—PCT/US2012/046895, The International Bureau of WIPO—Geneva, Switzerland, Apr. 1, 2014, 8 pp.

International Search Report and Written Opinion—PCT/US2012/046895—ISA/EPO—Nov. 7, 2013, 14 pp.

Lu et al., "CE4: Improvement on efficiency of high-level syntax in adaptive ROI coniditions", JVT Meeting; MPEG Meeting; Jan. 14, 2006-Jan. 20, 2006; Bangkok, TH; (Joint Video Team of ISO/IEC JTC1/SC29/WG11 and ITU-T SG.16), No. JVT-R043, XP030006310, 12 pp.

Tanaka, et al., "Quantization Matrix for HEVC," Document: JCTVC-E073, Joint Collaborative Team on Video Coding (JCT-VC) of ITU-T SG16 WP3 and ISO/IEC JTC1/SC29/WG11, 5th Meeting: Geneva, CH, Mar. 16-23, 2011, 24 pp.

Walker, et al. "Network Adaptation Layer and High-Level Syntax", JVT Meeting; MPEG Meeting; Jul. 22, 2002-Jul. 26, 2002; Klagenfurt, AT; (Joint Video Team of ISO/IEC JTC1/SC29/WG11 and ITU-T SG.16) No. JVT-D087r1-L, XP030005361, ISSN: 0000-0441, 18 pp.

Wenger, et al., "Slice parameter set", Mar. 10, 2011, No. JCTVC-E281, Mar. 10, 2011, XP030008787, ISSN: 0000-0007, 4 pp.

Wenger, et al.,"Adaptive Slice Parameter Set (APS)", JCT-VC Meeting; MPEG Meeting; Jul. 14, 2011-Jul. 22, 2011 ; Torino, IT; (Joint Collaborative Team on Video Coding of ISO/IEC JTC1/SC29/WG11 and ITU-T SG.16 ); URL: http://wftp3.itu.int/av-arch/jctvc-site/, No. JCTVC-F747, XP030009770, 8 pp.

Wenger "Parameter set updates using conditional replacement", JCT-VC Meeting; MPEG Meeting, Mar. 16, 2011-Mar. 23, 2011; Geneva; (Joint Collaborative Team on Video Coding of ISO/IEC JTC1/SC29/WG11 AND ITU-T SG.16); URL: http://wftp3.itu.int/av-arch/jctvc-site/, No. JCTVC-E309, XP030008815, 4 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Japanese Office Action from counterpart Japanese Application Serial No. 2014-521689, mailed Jan. 20, 2015, 34 pp.

Li, et al.,"Comments on Slice Common Information Sharing", JCT-VC Meeting; MPEG Meeting; Jul. 14, 2011-Jul. 22, 2011 ; Torino; (Joint Collaborative Team on Video Coding of ISO/IEC JTC1/SC29/WG11 and ITU-T SG.16 ); URL: http://wftp3.itu.int/av-arch/jctvc-site/, No. JCTVC-F187, XP030009210, 3 pp.

Lim, et al., "Text Description of Joint Model Reference Encoding Methods and Decoding Concealment Methods", [online], Jul. 3, 2007, Joint Video Team (JVT) of ISO/IEC MPEG and ITU-T VCEG, No. JVT-N046, 42 pp.

Reichel, et al., "Joint Scalable Video Model JSVM 1", [online], Feb. 17, 2005, Joint Video Team (JV) of ISO/IEC MPEG & ITU-T VCEG (ISO/IEC JTC1/SC29/WG11 and ITU-T SG16 Q.6), Document: JVT-N023, 39 pp.

Tanizawa, et al., "Adaptive Quantization Matrix Selection on KTA Software", [online], Oct. 22, 2006, ITU—Telecommunications Standardization Sector Study Group 16 Question 6 Video Coding Experts Group (VCEG), Document: VCEG-AD06, 5 pp.

Walker, et al., "Network Abstraction Layer and High-level Syntax", [online], Jan. 17, 2005, Joint Video Team (JV) of ISO/IEC MPEG & ITU-T VCEG (ISO/IEC JTC1/SC29/WG11 and ITU-T SG16 Q.6), Document: JVT-D087, 23 pp.

\* cited by examiner

ADAPTATION PARAMETER SETS FOR VIDEO CODING

This application claims the benefit of U.S. Provisional Application No. 61/509,015, filed Jul. 18, 2011, U.S. Provisional Application No. 61/511,477, filed Jul. 25, 2011, and U.S. Provisional Application No. 61/540,907, filed Sep. 29, 2011, each of which is hereby incorporated by reference in its respective entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

An upcoming video coding standard is the High Efficiency Video Coding (HEVC) standard, "HEVC Working Draft 7," or "WD7," is described in document HCTVC-11003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012, which, as of Jun. 25, 2102, is downloadable from http://phenix.it-sudparis.eu/jct/doc_end_user/documents/9_Geneva/wg11/JCTVC-11003-v3.zip. Another HEVC working draft, referred to as "HEVC Working Draft 6" or "WD6," is described in document JCTVC-H1003, Bross et al., "High efficiency video coding (HEVC) text specification draft 6," Joint Collaborative Team on Video Coding (JCT-VC) of ITU-T SG16 WP3 and ISO/IEC JTC1/SC29/WG11, 8th Meeting: San Jose, Calif., USA, February, 2012, which, as of Jun. 25, 2012, is downloadable from http://phenix.int-evry.fr/jct/doc_end_user/documents/8_San_Jose/wg11/JCTVC-H1003-v22.zip.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to data of previously coded reference frames.

SUMMARY

In general, this disclosure describes techniques for signaling one or more parameters for slices of video data using adaptation parameter sets for video coding. In addition, this disclosure provides memory management techniques for determining that adaptation parameter sets may be removed from a buffer of a video coding device, such as a video decoding device. In this manner, a video coding device may avoid storing excess data in a buffer, which may improve memory utilization of the video coding device.

In one example, a method of decoding video data includes storing an adaptation parameter set (APS) data structure in a buffer of a coding device, wherein the APS data structure includes signaling data applicable to one or more slices of video data, decoding at least one of the slices based on the signaling data of the APS data structure, after decoding the slice, determining that the APS data structure can be removed from the buffer, removing the APS data structure from the buffer based on the determination, and decoding one or more additional slices of the video data after removing the APS data structure from the buffer.

In another example, a device for decoding video data includes a video decoder configured to store an adaptation parameter set (APS) data structure in a buffer of a coding device, wherein the APS data structure includes signaling data applicable to one or more slices of video data, decode at least one of the slices based on the signaling data of the APS data structure, after decoding the slice, determine that the APS data structure can be removed from the buffer, remove the APS data structure from the buffer based on the determination, and decode one or more additional slices of the video data after removing the APS data structure from the buffer.

In another example, a device for decoding video data includes means for storing an adaptation parameter set (APS) data structure in a buffer of a coding device, wherein the APS data structure includes signaling data applicable to one or more slices of video data, means for decoding at least one of the slices based on the signaling data of the APS data structure, means for after decoding the slice, determining that the APS data structure can be removed from the buffer, means for removing the APS data structure from the buffer based on the determination, and means for decoding one or more additional slices of the video data after removing the APS data structure from the buffer.

In another example, a computer-readable storage medium has stored thereon instructions that, when executed, cause a processor to store an adaptation parameter set (APS) data structure in a buffer of a coding device, wherein the APS data structure includes signaling data applicable to one or more slices of video data, decode at least one of the slices based on the signaling data of the APS data structure, after decoding the slice, determine that the APS data structure can be removed from the buffer, remove the APS data structure from the buffer based on the determination, and decode one or more additional slices of the video data after removing the APS data structure from the buffer.

In another example, a method of encoding video data includes encoding a first set of one or more slices of video data using one or more parameters, signaling the one or more parameters in an adaptation parameter set (APS) data structure, and encoding a second set of one or more slices of the video data following a determined slice of the first set of one or more slices without reference to the APS data structure.

In another example, a device for encoding video data includes a video encoder configured to encode a first set of one or more slices of video data using one or more parameters, signal the one or more parameters in an adaptation parameter set (APS) data structure, and encode a second set of one or more slices of the video data following a determined slice of the first set of one or more slices without reference to the APS data structure.

In another example, a device for encoding video data includes means for encoding a first set of one or more slices of video data using one or more parameters, means for signaling the one or more parameters in an adaptation parameter set (APS) data structure, and means for encoding a second set of one or more slices of the video data following a determined slice of the first set of one or more slices without reference to the APS data structure.

In another example, a computer-readable storage medium has stored thereon instructions that, when executed, cause a processor to encode a first set of one or more slices of video data using one or more parameters, signal the one or more parameters in an adaptation parameter set (APS) data structure, and encode a second set of one or more slices of the video data following a determined slice of the first set of one or more slices without reference to the APS data structure.

The details of one or more examples are set forth in the accompanying drawings and the description below. Other features, objects, and advantages will be apparent from the description and drawings, and from the claims.

DETAILED DESCRIPTION

Figure 1:
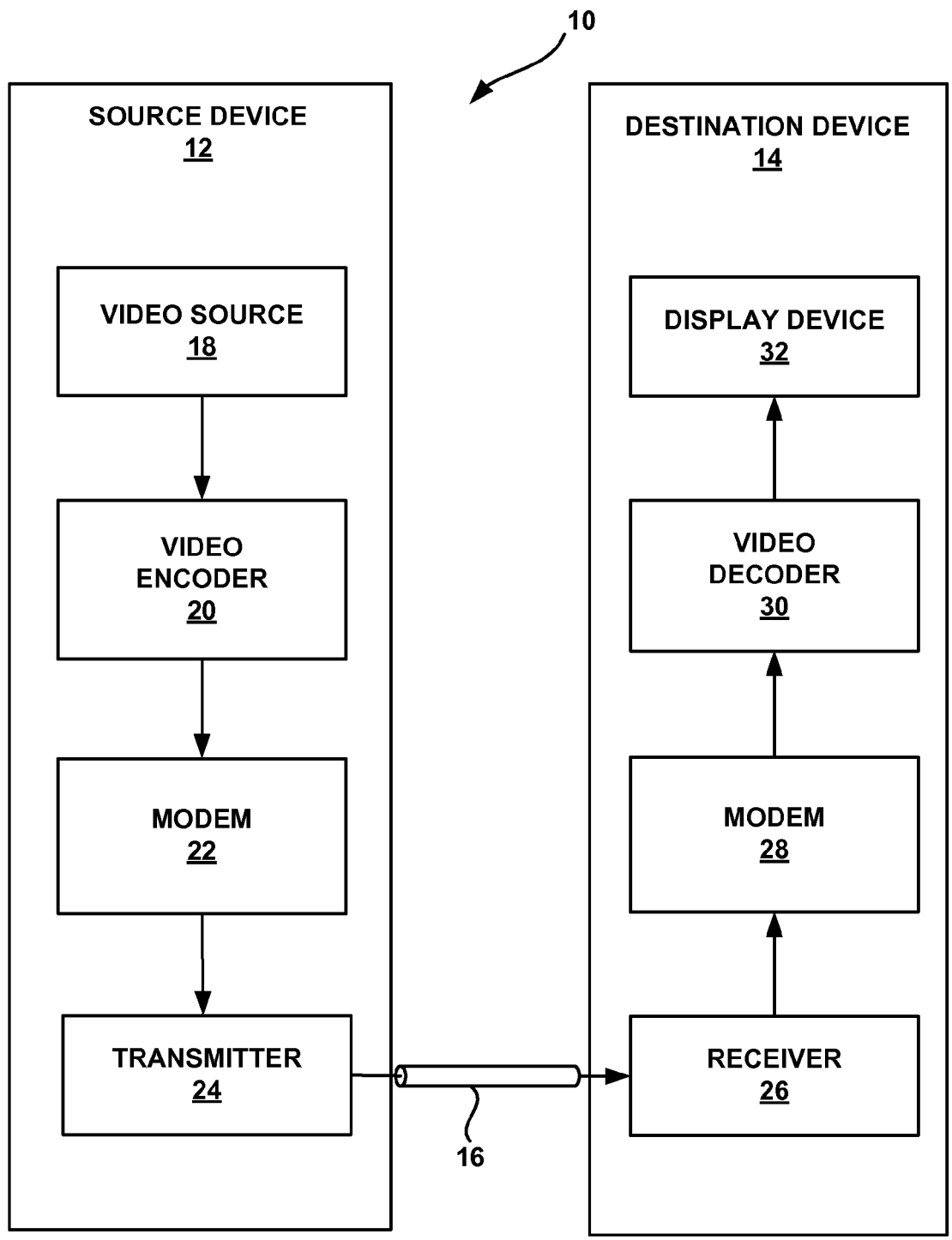
FIG. 1 is a block diagram illustrating an example video encoding and decoding system that may utilize techniques for utilizing adaptation parameter set (APS) data structures.

In general, this disclosure describes techniques for coding of video data. Video data typically includes both coded data and syntax data for signaling characteristics of the coded data. Coded data includes data for forming prediction data, such as prediction units (PUs) for coding units (CUs) of a frame, as well as quantized transform coefficients of transform units (TUs) for the CUs.

One type of syntax data is adaptive loop filter (ALF) coefficients. In some cases, filters are applied to decoded video data, e.g., to deblock the video data. When applied by a video coding device as part of the coding process, such filters are said to be applied "in-loop," in that the filtered data may be used for reference for subsequently coded video data, i.e., to support predictive coding. In particular, the filter data may be added to a decoded picture buffer (DPB) for use in predictive coding. A video encoder may determine the filter coefficients for the ALF individually, e.g., individually per frame or per slice of video data, and encode the coefficients as syntax data in the bitstream.

Another type of syntax data is sample adaptive offset (SAO) parameters. Residual data refers to pixel difference data between a block to be coded and a predictive block. Residual data may be transformed from a spatial domain to a transform domain. Application of the transform to the residual data produces transform coefficients, which may be expressed in the frequency domain. Accordingly, a TU may have a direct current (DC) coefficient expressing the fundamental frequency, and a plurality of alternating current (AC) coefficients. In some cases, the coefficient for the fundamental frequency may be modified by an offset value, signaled as syntax data. Additionally or alternatively, values of one or more of the AC coefficients may also be modified by an offset value. These offset values may be signaled as SAO parameters.

High Efficiency Video Coding (HEVC) has introduced an adaptation parameter set (APS) data structure that signals various parameters, such as ALF coefficients and SAO parameters, for one or more slices of video data. That is, an APS data structure may apply to a single slice, or may apply to a plurality of slices. A slice may use multiple APSs, and an APS may apply to more than one slice. Each APS includes an identifier (ID) value, and a slice may indicate that an APS applies to the slice by signaling the ID for the APS. The ID value for an APS may uniquely identify the APS for the corresponding bitstream.

As defined in Working Draft 6 of HEVC, the APS includes:
parameters that can be referred to by the coded slice NAL units of one or more coded pictures when at least one of sample_adaptive_offset_enabled_flag or adaptive_loop_filter_enabled_flag are equal to 1. Each adaptation parameter set RBSP [raw byte sequence payload] is initially considered not active at the start of the operation of the decoding process. At most one adaptation parameter set RBSP is considered active at any given moment during the operation of the decoding process, and the activation of any particular adaptation parameter set RBSP results in the deactivation of the previously-active adaptation parameter set RBSP (if any).

When an adaptation parameter set RBSP (with a particular value of aps_id) is not active and it is referred to by a coded slice NAL unit (using that value of aps_id), it is activated. This adaptation parameter set RBSP is called the active adaptation parameter set RBSP until it is deactivated by the activation of another adaptation parameter set RBSP. An adaptation parameter set RBSP, with that particular value of aps_id, shall be available to the decoding process prior to its activation.

The above description is set forth in HEVC WD6, at page 67.

As with other parameter set data structures, such as sequence parameter sets (SPSs) and picture parameter sets (PPSs), APSs are conventionally stored in a buffer of a video coding device, e.g., a video decoder, until the end of a coded video sequence. However, APSs include significantly more data than SPSs and PPSs. This disclosure provides memory management techniques for handling APSs more efficiently than the conventional techniques of HEVC.

In some examples, APSs include data indicating that one or more previous APSs are not needed anymore. Accordingly, in response to receiving a current APS including data that indicates a previous APS is no longer needed, a video decoder may delete the previous APS indicated by the current APS from the buffer, providing additional space in the buffer.

Additionally or alternatively, each APS may include a flag indicating whether the APS is used once or more than once. If the APS is used only once, then as soon as the subsequent slice has been decoded, the APS can be deleted. On the other hand, if the APS is used more than once, as indicated by the flag, the APS may be stored for the remainder of the coded video sequence, or until the APS is indicated as no longer needed, e.g., as discussed above.

As another example, there may be an explicit indication of the maximum number of APSs to be stored in the buffer at any one time. If the buffer includes the maximum number of APSs, and a new APS is received, an APS may be removed from the buffer, e.g., in first in, first out (FIFO) order. Alternatively, the ID values may be assigned in such a way that the ID values are indicative of a priority of storage for the APSs, and thus, the APS with the lowest priority, based on its ID value compared to ID values of other stored APSs, may be removed when the maximum number of APSs is currently stored. That is, the encoder may guarantee that these APSs will not be needed in the future, or if data that is substantially similar to these APSs is needed, that the encoder will provide this data in a future section of the bitstream, such that the APSs can safely be removed. For example, ID values for APSs may be assigned in an incremental manner, such that lower ID values indicate lower priorities, or larger ID values may be assigned to APSs that are foreseen as being used more frequently than others.

In some examples, all or a portion of an APS may be predicted from one or more previous APSs. For example, the APS may include an indication that its ALF coefficients are the same as a first previous APS, and its SAO parameters are the same as a second previous APS. Alternatively, one of the ALF coefficients or the SAO parameters may be explicitly signaled, and the other may be indicated as being the same as those of a previous APS. In such cases, an APS associated with a coded picture may be constrained to refer only to an APS associated with coded pictures having an equal or lower temporal_ID value, such that sub-bitstream extraction does not impede the use of the dependent APS.

In some examples, APSs may only refer to previous APSs that have been received since the last random access point. Moreover, following a random access point, all APSs may be removed from the buffer, in some examples.

This disclosure also proposes some examples in which certain modifications are made to the APS of HEVC. For example, in addition, or in the alternative, to the syntax data discussed above, the APS may signal any or all of reference picture list modification data, reference picture list combination data, memory management control operation syntax data, and/or weighted prediction tables. Accordingly, an APS may include signaling data comprising one or more of ALF coefficients, SAO parameters, reference picture list modification data, reference picture list combination data, memory management control operation syntax data, and/or weighted prediction tables. In this manner, decoded picture buffer management, e.g., via a memory management control operation (MMCO) syntax table and/or weighted prediction table, may also be included into the APS.

Other slice or picture level information can also be signaled in the APS, such as quantization matrices. In general, any set of information can be present or not present in the APS. If that set is not present in a specific APS, the APS may refer to a different APS to get that set of information, and an APS may refer to multiple APSs to get different sets of information. For example, an APS may have the SAO parameters signaled, but refer to a first different APS for the quantization matrices, refer to a second different APS for ALF parameters and even refer to a third APS for decoded picture buffer management and reference picture list construction.

FIG. 1 is a block diagram illustrating an example video encoding and decoding system 10 that may utilize techniques for utilizing adaptation parameter set (APS) data structures. APS data structures may also be referred to as adaptation slice parameter sets, in that APSs generally include parameters for a slice. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radio-telephones, or any wireless devices that can communicate video information over a communication channel 16, in which case communication channel 16 is wireless. The techniques of this disclosure, however, which concern utilizing APS data structures, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless, wired, or storage media suitable for transmission or storage of encoded video data.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 may be configured to apply the techniques for utilizing APS data structures. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for utilizing APS data structures may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process may implement one or more of the techniques described herein to utilizing APS data structures. The information communicated over channel 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, source device 12 may store encoded data onto a storage medium, rather than transmitting the data. Likewise, destination device 14 may be configured to retrieve encoded data from a storage medium such as, for example, a Blu-Ray disc, DVD disc, a Flash drive, or the like.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

Efforts are currently in progress to develop a new video coding standard, currently referred to as High Efficiency Video Coding (HEVC). The upcoming standard is also referred to as H.265. The standardization efforts are based on a model of a video coding device referred to as the HEVC Test Model (HM). The HM presumes several capabilities of video coding devices over devices according to, e.g., ITU-T H.264/ AVC. For example, whereas H.264 provides nine intra-prediction encoding modes, HM provides as many as thirty-four intra-prediction encoding modes.

A group of pictures (GOP), sometimes referred to as a video sequence, generally includes a series of one or more video pictures. A GOP may include syntax data in a header of the GOP, a header of one or more pictures of the GOP, or elsewhere, that describes a number of pictures included in the GOP. Each picture may include picture syntax data that describes an encoding mode for the respective picture. Each video picture may include a plurality of slices, where each slice includes a series of one or more largest coding units (LCUs). Video encoder 20 typically operates on video blocks within individual slices of a picture in order to encode the video data. A video block may correspond to a block or a partition of a block, such as an LCU or a sub-CU thereof. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

HEVC refers to a block of video data as a coding unit (CU), which may include one or more prediction units (PUs) and/or one or more transform units (TUs). Syntax data within a bitstream may define a largest coding unit (LCU), which is a largest coding unit in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" to refer to any of a CU, PU, or TU.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1, also referred to as L0 and L1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

A leaf-CU may include one or more transform units (TUs). The transform units may be specified using a TU quadtree structure, as discussed above. That is, a split flag may indicate whether a leaf-CU is split into four transform units. Then, each transform unit may be split further into 4 sub TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the predictive values corresponding to the TU and the original block. The residual value may be transformed, quantized, and scanned. For inter coding, a video encoder may perform prediction at the PU level and may calculate a residual for each PU. The residual values corresponding to a leaf-CU may be transformed, quantized, and scanned. For inter coding, a leaf-TU may be larger or smaller than a PU. For intra coding, a PU may be collocated with a corresponding leaf-TU. In some examples, the maximum size of a leaf-TU may be the size of the corresponding leaf-CU.

In general, this disclosure uses the terms CU and TU to refer to leaf-CU and leaf-TU, respectively, unless noted otherwise. In general, the techniques of this disclosure relate to transforming, quantizing, scanning, and entropy encoding data of a CU. As an example, the techniques of this disclosure include selection of a transform to use to transform a residual value of an intra-predicted block based on an intra-prediction mode used to predict the block. This disclosure also uses the term "directional transform" or "designed transform" to refer to such a transform that depends on intra-prediction mode direction. That is, a video encoder may select a directional transform to apply to a transform unit (TU). As noted above, intra-prediction includes predicting a TU of a current CU of a picture from previously coded CUs and TUs of the same picture. More specifically, a video encoder may intra-predict a current TU of a picture using a particular intra-prediction mode.

In accordance with the techniques of this disclosure, video encoder 20 may encode slices using one or more parameters. These parameters may include any or all of the following: adaptive loop filter (ALF) coefficients, sample adaptive offset (SAO) parameters, picture list modification data, reference picture list combination data, memory management control operation syntax data, weighted prediction tables, and quantization matrices. Video encoder 20 may signal any or all of these parameters and/or data in an APS data structure. Video encoder 20, or another element of source device 12, may form a separate video coding layer (VCL) network abstraction layer (NAL) unit including the APS data structure. Thus, a VCL NAL unit may include an APS data structure, and another VCL NAL unit may include coded data for a slice, where the slice may be coded using parameters signaled in the APS data structure.

An APS may be called "associated" with a coded picture if the APS sits before the first slice of that coded picture and there is no slice between the first slice of the coded picture and the APS. Moreover, in some examples, an APS may be associated with a slice that immediately follows the APS in the bitstream. For example, an APS may be associated with a slice when the NAL unit including the APS is immediately followed by the NAL unit including the slice in the bitstream. A slice may use multiple APSs, and an APS may be used for multiple slices.

Video encoder 20 may construct APSs for a bitstream with unique identifiers in the scope of that bitstream. For example, video encoder 20 may signal an aps_parameter_set_id value for each APS data structure. The APS identifier may also be referred to as "aps_id" as a syntax element. Video encoder 20 may further indicate that a slice is associated with an APS data structure by signaling the identifier (ID) value of the APS in the slice, e.g., a header of the slice. In some examples, a slice need not include information identifying the APS, e.g., if the slice can be determined to be associated with an APS in other ways, such as if the APS is signaled immediately before the slice.

In accordance with the techniques of this disclosure, video encoder 20 may provide (that is, signal) information indicating when an APS can be removed from a buffer of a video decoder, such as video decoder 30. Likewise, in accordance with the techniques of this disclosure, video decoder 30 may be configured to determine when an APS can be removed, e.g., based in information signaled by video encoder 20, and to remove the APS. In this manner, memory resources of video decoder 30 consumed by the APS can be reallocated after the APS is removed. Thus, whereas conventionally, parameter set data structures would be stored until the end of a full video sequence, this disclosure provides techniques for signaling when to remove, and for removing, parameter set data structures, such as APSs, from a memory of a video decoder, which may allow the video decoder to reallocate memory resources and thereby operate more efficiently.

This disclosure also provides techniques for signaling certain slice or picture level information in an APS. For example, rather than signaling information that may be applicable to multiple slices or pictures in slice headers or picture headers, this disclosure provides techniques for signaling such data in the APS. More specifically, in some examples, such data may be the information which was previously (that is, prior to adoption of the techniques of this disclosure) provided in a picture parameter set, including, for example, quantization matrices. Such data may be the information in slice header such as, for example, data associated with memory management control operation syntax tables, reference picture lists and/or weighted prediction tables. Moreover, this disclosure provides techniques for reusing such data between multiple APSs. Thus, if a subsequent APS would include the same data as a previous APS, rather than signaling the common data in the subsequent APS, the subsequent APS may instead refer back to the previous APS. These techniques may thereby reduce the size of subsequent APSs, which may therefore reduce the amount of memory consumed by each subsequent APS. That is, video encoder 20 need only signal data that is different in a subsequent APS, and indicate in the subsequent APS that other data is signaled in a previous APS.

Following intra-predictive or inter-predictive coding to produce predictive data and residual data, and following any transforms (such as a discrete cosine transform (DCT)) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data may be performed, e.g., according to content adaptive variable length coding (CAVLC), context adaptive binary arithmetic coding (CABAC), or another entropy coding methodology. A processing unit configured for entropy coding, or another processing unit, may perform other processing functions, such as zero run length coding of quantized coefficients and/or generation of syntax information such as coded block pattern (CBP) values, block type, coding mode, maximum block size for a coded unit (such as a frame, slice, block, or sequence), or the like.

Video decoder 30 may ultimately receive one or more APS data structures from, e.g., video encoder 20. Rather than storing the APS data structures until the end of a coded video sequence, however, video decoder 30 may be configured to remove one or more APS data structures prior to reaching the end of the coded video sequence. In accordance with the techniques of this disclosure, as discussed in greater detail below, video decoder 30 may be configured with one or more memory management techniques with respect to managing APS data structures, e.g., storage and removal of APS data structures in a buffer of video decoder 30, as described in this disclosure.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
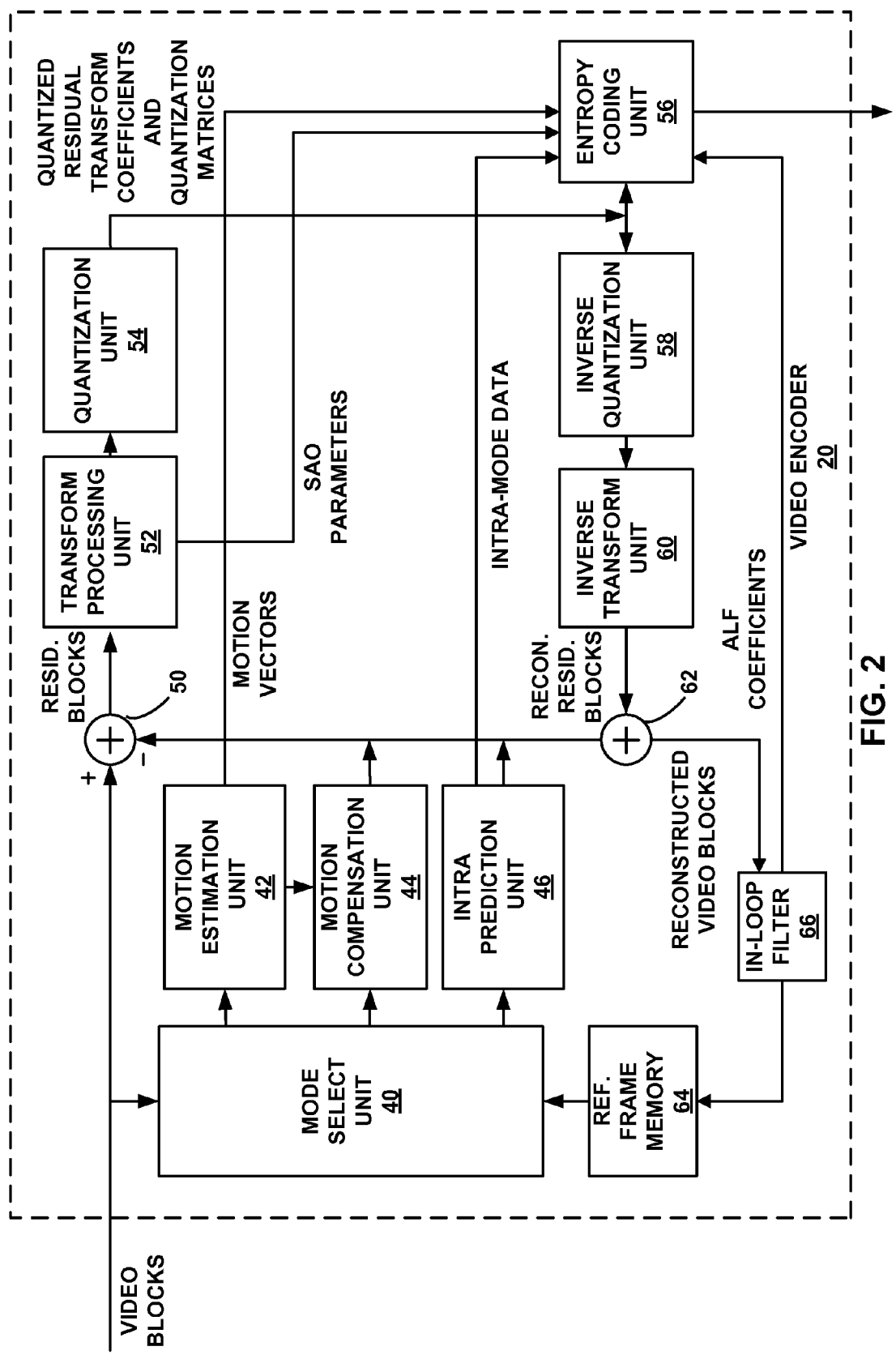
FIG. 2 is a block diagram illustrating an example of a video encoder that may implement techniques for utilizing APS data structures.

FIG. 2 is a block diagram illustrating an example of video encoder 20 that may implement techniques for utilizing APS data structures. Video encoder 20 may perform intra- and inter-coding of blocks within video frames, including blocks, or partitions or sub-partitions of blocks. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes and inter-modes such as uni-directional prediction (P-mode) or bi-directional prediction (B-mode) may refer to any of several temporal-based compression modes.

As shown in FIG. 2, video encoder 20 receives a current video block within a video frame to be encoded. In the example of FIG. 2, video encoder 20 includes motion compensation unit 44, motion estimation unit 42, intra-prediction unit 46, reference frame memory 64, summer 50, transform processing unit 52, quantization unit 54, and entropy coding unit 56. For video block reconstruction, video encoder 20 also includes inverse quantization unit 58, inverse transform unit 60, summer 62, and in-loop filter 66.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame.

Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a block. Motion compensation may involve fetching or generating the predictive block based on the motion vector determined by motion estimation. Again, motion estimation unit 42 and motion compensation unit 44 may be functionally integrated, in some examples.

Motion estimation unit 42 calculates a motion vector for the video block of an inter-coded frame by comparing the video block to video blocks of a reference frame in reference frame memory 64. Motion compensation unit 44 may also interpolate sub-integer pixels of the reference frame, e.g., an I-frame or a P-frame. Two lists, for example, may include reference frames: list 0, which includes reference frames having a display order earlier than a current frame being encoded, and list 1, which includes reference frames having a display order later than the current frame being encoded.

Therefore, data stored in reference frame memory 64 may be organized according to these lists.

Motion estimation unit 42 compares blocks of one or more reference frames from reference frame memory 64 to a block to be encoded of a current frame, e.g., a P-frame or a B-frame. When the reference frames in reference frame memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in reference frame memory 64 if no values for sub-integer pixel positions are stored in reference frame memory 64. Motion estimation unit 42 sends the calculated motion vector to entropy coding unit 56 and motion compensation unit 44. The reference frame block identified by a motion vector may be referred to as a predictive block.

Motion compensation unit 44 may calculate prediction data based on the predictive block. Video encoder 20 forms a residual video block by subtracting the prediction data from motion compensation unit 44 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms, such as those defined by the H.264 standard, which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Quantization unit 54 quantizes the residual transform coefficients to further reduce bit rate. The quantization process may reduce the bit depth associated with some or all of the coefficients. The degree of quantization may be modified by adjusting a quantization parameter.

Following quantization, entropy coding unit 56 entropy codes the quantized transform coefficients and syntax elements. For example, entropy coding unit 56 may perform content adaptive variable length coding (CAVLC), context adaptive binary arithmetic coding (CABAC), or another entropy coding technique. Following the entropy coding by entropy coding unit 56, the encoded video may be transmitted to another device or archived for later transmission or retrieval. In the case of context adaptive binary arithmetic coding, context may be based at least in part on data for neighboring blocks.

In some cases, entropy coding unit 56 or another unit of video encoder 20 may be configured to perform other coding functions, in addition to entropy coding. For example, entropy coding unit 56 may be configured to determine the CBP values for the blocks and partitions. Also, in some cases, entropy coding unit 56 may perform run length coding of the coefficients in a block or partition thereof. In particular, entropy coding unit 56 may apply a zig-zag scan or other scan pattern to scan the transform coefficients in a block or partition and encode runs of zeros for further compression. Entropy coding unit 56 also may construct header information with appropriate syntax elements for transmission in the encoded video bitstream.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

In the example of FIG. 2, video encoder 20 also includes in-loop filter 66. In-loop filter 66 may perform adaptive filtering techniques, e.g., to deblock frames of video data stored in reference frame memory 64. In this example, in-loop filter 66 performs adaptive filtering. That is, in-loop filter adaptively modifies filtering coefficients (referred to as adaptive loop filter (ALF) coefficients) to improve filtering results. The ALF coefficients used by in-loop filter 66 may be signaled in an APS for a slice including blocks filtered using those ALF coefficients. Moreover, in accordance with the techniques of this disclosure, subsequent APSs may reuse the ALF coefficients of a previous APS, e.g., by referring to the APS ID of the APS including the ALF coefficients to be used by the subsequent APS. In this manner, the subsequent APS itself need not signal the values for the ALF coefficients directly, which may reduce the size of the subsequent APS.

In accordance with the techniques of this disclosure, the same ALF coefficients may be used for all blocks of a common slice. Video encoder 20 may signal the ALF coefficients in an APS for the slice, and the slice may include a reference to the APS, e.g., an indication of the APS ID. Moreover, video encoder 20 may use the same ALF coefficients for multiple different slices. Thus, each of the slices may refer to the same APS, to use the same ALF coefficients. Alternatively, if other aspects of the slices are coded using different parameters, video encoder 20 may provide different APSs for these other slices to capture the differences in the signaled parameters. As discussed below, video encoder 20 may provide the ALF coefficients in each APS, or video encoder 20 may include a reference to the previous APS that included the ALF coefficients, assuming that video encoder 20 uses the same ALF coefficients to code the subsequent slice.

Transform processing unit 52 may apply sample adaptive offsets (SAOs) to one or more transform coefficients, e.g., direct current (DC) coefficients and/or alternating current (AC) coefficients. Transform processing unit 52 may apply the same SAO parameters to TUs of a slice, frame, sequence, GOP, or other coded unit of video data. In accordance with the techniques of this disclosure, video encoder 20 may also (additionally or alternatively) signal SAO parameters in an APS data structure for one or more slices.

Quantization unit 54 may apply quantization to transform coefficients of a TU using a quantization matrix along with a specified quantization parameter. Quantization unit 54 may apply the quantization matrix to a slice, frame, sequence, GOP, or other coded unit of video data. In accordance with the techniques of this disclosure, video encoder 20 may also (additionally or alternatively) signal the quantization matrix in an APS data structure for one or more slices.

In addition, or in the alternative, video encoder 20 may signal other parameters in an APS data structure. For example, video encoder 20 may signal any or all of picture list modification data, reference picture list combination data, memory management control operation syntax data, and weighted prediction tables in APS data structures, in addition to or in the alternative to the other data discussed above. For example, video encoder 20 may signal how reference frame memory 64 was manipulated for picture list modification data, and/or how to combine two lists (e.g., L0 and L1) to form a combined reference picture list, in an APS data structure.

Furthermore, in accordance with the techniques of this disclosure, video encoder 20 may provide information indicating when a particular APS can be removed. Thus, video decoders, such as video decoder 30, receiving such information can delete APSs before the end of the video sequence. As an example, an APS may remain active until a subsequent APS is signaled, in which case the previous APS may be deleted. Accordingly, video encoder 20 may indicate that a previous APS can be deleted by simply providing a subsequent APS.

Alternatively, video encoder 20 may provide a flag or other value in each APS, indicating whether one or more previously provided APSs can be deleted. For example, video encoder 20 may provide a flag indicating whether the immediately previous APS can safely be deleted. As another example, video encoder 20 may include one or more APS ID values in a subsequent APS, where the APS ID values refer to one or more APSs that can safely be deleted. As still another example, video encoder 20 may include a flag in each APS indicating whether the APS is needed for more than one unit of coded video data, e.g., for more than slice or more than one picture. Thus, if the flag indicates that the APS is only needed for one unit of video data, after coding that unit, the APS can be deleted.

As yet another example, video encoder 20 may provide an indication of a maximum number of APSs that are to be stored simultaneously. After providing more than that number of APSs, one or more of the previously stored APSs can be deleted. The strategy for deleting APSs in excess of the indicated number of APSs may be, for example, first-in, first-out (FIFO). Alternatively, there may be a sliding window for the APSs based on APS ID values. For example, APS IDs may be assigned based on importance, e.g., where lower-valued APS ID values are considered more important than higher-valued APS ID values. In other words, if the number of APSs exceeds the indicated maximum number, the APSs with the highest APS ID values may be removed, until the number of stored APSs reaches the maximum number. Alternatively, APS ID values that are lower valued may be considered less important than higher-valued APS ID values. Video encoder 20 may assign APS IDs such that the APS ID values are always increasing, or may determine that a particular APS will likely be more important, and assign the APS ID accordingly.

Video encoder 20 may be configured to code data according to a temporal hierarchy for temporal scalability. That is, video encoder 20 may assign various temporal identifier (temporal ID) values to pictures. As an example, pictures having temporal IDs of "0" may be used to produce video playback at 15 frames per second (fps), pictures having temporal IDs of "1" may be used, in combination with pictures having temporal IDs of "0," to produce video playback at 30 fps, and so on. More generally, pictures having a temporal ID of "N," when combined with pictures having temporal IDs less than N, may be used to produce a playback having a frame rate that is greater than using pictures having temporal IDs up to "N−1," but less than that of pictures having temporal IDS above N.

Video encoder 20 may associate APSs with slices or pictures at one or more temporal layers. Thus, video encoder 20 may assign a temporal ID to an APS as well. Video encoder 20 may further enforce a constraint that, when an APS has a temporal ID of N, slices having temporal IDs less than N do not refer to the APS having the temporal ID of N. In this manner, if a video decoder, such as video decoder 30, performs temporal scalability, in which case the video decoder does not receive video data having temporal IDs equal to or greater than N, the video decoder will still be capable of decoding the received video data.

Moreover, video encoder 20 may release APS ID values. Typically, after an APS ID value has been used, that APS ID is associated with its corresponding APS. However, video encoder 20 may disassociate an APS ID from the APS including that APS ID after the APS has been removed from memory. In this manner, the APS ID may be reused, e.g., in a different APS.

Furthermore, video encoder 20 may periodically flush stored APSs. For example, after an instantaneous decoder refresh (IDR) picture, video encoder 20 may assume that all APSs have been cleared from the decoder memory. In this manner, pictures and slices following an IDR picture can only refer to APSs occurring after the IDR picture. Moreover, video encoder 20 may release the APS IDs associated with APSs prior to the IDR picture, such that video encoder 20 can reuse these APS IDs without introducing ambiguity. In this manner, these techniques may support random access, in that a video decoder can successfully decode a video bitstream starting at an IDR random access point (RAP), without needing to retrieve data prior to the IDR RAP, such as APS data signaled prior to the IDR RAP.

As discussed above, in some examples, video encoder 20 may reuse data between APSs. That is, if a subsequent APS includes parameter data that is the same as parameter data of a previous APS, the subsequent APS may simply include a reference to the previous APS for that parameter data, rather than signaling the same parameter data repeatedly. For example, if the previous APS signaled ALF coefficients and SAO parameters, and video encoder 20 encodes a subsequent slice using the same ALF coefficients but different SAO parameters, video encoder 20 may construct a subsequent APS signaling the different SAO parameters but include a reference to the ALF coefficients of the previous APS. In this manner, video encoder 20 may avoid signaling the same APS parameters in multiple APSs repeatedly, which may avoid wasted bandwidth, storage space, and buffer resources in a video decoder, such as video decoder 30. Furthermore, a subsequent APS may refer to multiple different APSs, for different parameters. That is, the subsequent APS may include a first reference to a first previous APS for a first parameter, and a second reference to a second, different APS for a second, different parameter.

In this manner, video encoder 20 represents an example of a video encoder configured to encode a first set of one or more slices of video data using one or more parameters, signal the one or more parameters in an adaptation parameter set (APS) data structure, and encode a second set of one or more slices of the video data following a determined slice of the first set of one or more slices without reference to the APS data structure.

Figure 3:
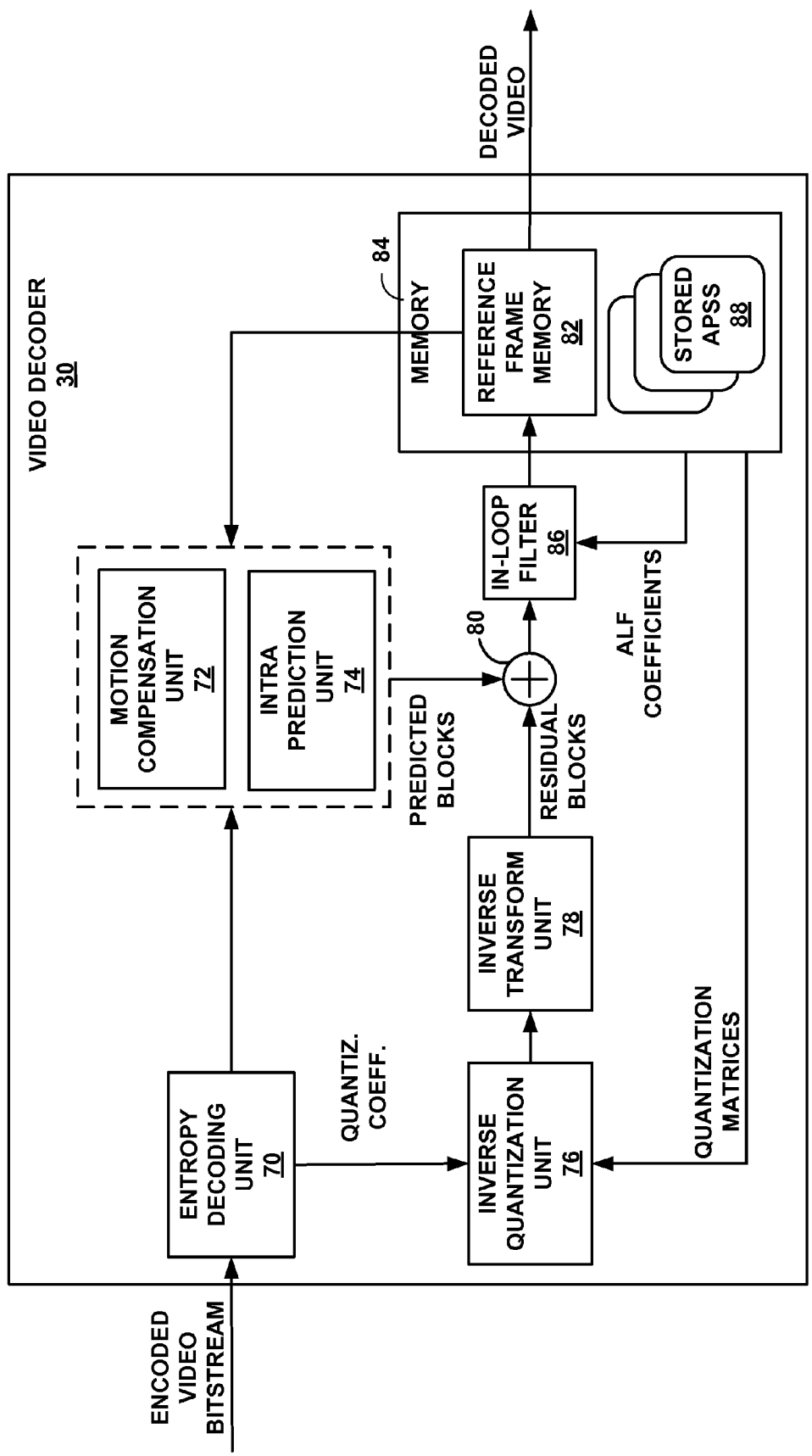
FIG. 3 is a block diagram illustrating an example of a video decoder that may implement techniques for utilizing APS data structures.

FIG. 3 is a block diagram illustrating an example of video decoder 30 that may implement techniques for utilizing APS data structures. In the example of FIG. 3, video decoder 30 includes an entropy decoding unit 70, motion compensation unit 72, intra prediction unit 74, inverse quantization unit 76, inverse transformation unit 78, memory 84 including reference frame memory 82, in-loop filter 86, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

In general, as explained in greater detail below, video decoder 30 receives and stores APS data structures in memory 84, in accordance with the techniques of this disclosure. Moreover, video decoder 30 may delete one or more of stored APSs 88 prior to the end of a corresponding video sequence. For example, video decoder 30 may delete one or more of stored APSs 88 prior to receiving a subsequent IDR RAP. Likewise, stored APSs 88 may refer to one or more other stored APSs 88, such that video decoder 30 may retrieve data from two or more of stored APSs 88 while decoding a single slice. Furthermore, stored APSs 88 may provide additional data relative to the APSs of conventional HEVC techniques, as explained below.

Motion compensation unit 72 may use motion vectors received in the bitstream to identify a prediction block in reference frames in reference frame memory 82 of memory 84. Intra prediction unit 74 may use intra prediction modes received in the bitstream to form a prediction block from spatially adjacent blocks. Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard. The inverse quantization process may also include use of a quantization parameter $QP_Y$ calculated by encoder 50 for each block to determine a degree of quantization and, likewise, a degree of inverse quantization that should be applied. In accordance with the techniques of this disclosure, inverse quantization unit 76 may receive one or more quantization matrices from one or more of stored APSs 88 to perform inverse quantization.

Inverse transform unit 58 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information, e.g., as provided in an APS, and use the interpolation filters to produce predictive blocks.

Motion compensation unit 72 uses some of the syntax information to determine sizes of blocks used to encode frame(s) of the encoded video sequence, partition information that describes how each block of a frame of the encoded video sequence is partitioned, modes indicating how each partition is encoded, one or more reference frames (and reference frame lists) for each inter-encoded block or partition, and other information to decode the encoded video sequence.

Summer 80 sums the residual blocks with the corresponding prediction blocks generated by motion compensation unit 72 or intra-prediction unit to form decoded blocks. As shown in FIG. 3, a deblocking filter, represented by in-loop filter 86, may be applied to filter the decoded blocks in order to remove blockiness artifacts. In accordance with the techniques of this disclosure, in-loop filter 86 receives ALF coefficients from one or more of stored APSs 88 and uses the ALF coefficients to filter the output of summer 80. For example, in-loop filter 86 may retrieve ALF coefficients from one of stored APSs 88 to which a current slice corresponds, e.g., as indicated by an APS identifier signaled in a slice header for the current slice. In this manner, video decoder 30 may decode and filter video blocks in a manner that is substantially similar to the decoding process of video encoder 20, represented by inverse quantization unit 58, inverse transform unit 60, summer 62, and in-loop filter 66 (FIG. 2). The decoded video blocks are then stored in reference frame memory 82, which provides reference blocks for subsequent motion compensation and also produces decoded video for presentation on a display device (such as display device 32 of FIG. 1).

Video decoder 30 may receive APS data structures formed by, e.g., video encoder 20. Video decoder 30 may further decode and store APS data structures in a memory, such as memory 84. Stored APSs 88 represent examples of APSs stored in memory 84 of video decoder 30. It should be understood, however, that APSs need not necessarily be stored in the same memory as reference frame memory 82. In some examples, when video decoder 30 parses and stores an APS in memory 84, it may be temporarily stored and then removed, e.g., upon decoding a subsequent slice or when the whole associated picture including the slice to which the APS corresponds is decoded. In general, video decoder 30 receives information, e.g., from video encoder 20, indicating when one of stored APSs 88 can be removed from memory 84. Memory 84 may also be referred to as a "buffer," or may include a portion arranged as a buffer for storing APS data structures in accordance with the techniques of this disclosure. Entropy decoding unit 70 may provide APS data directly to memory 84, in some examples.

In some examples, a flag can be added to the APS, indicating that this APS explicitly marks at least one of the previous APSs as not being needed for future use any more. If one of stored APSs 88 is marked as not needed by such a flag or other syntax element, video decoder 30 may delete the marked, decoded APS from the memory, e.g., memory 84. In some examples, a flag is added into the APS, indicating that a corresponding one of stored APSs 88 may be needed for further usage, right after its containing picture is decoded. Video decoder 30 may delete one or more of stored APSs 88 that have such a flag that indicates that the APS is not needed for further usage, but store APSs for which the flag indicates that the APS is needed further.

In some examples, configuration data of video decoder 30 may specify a maximum number of stored APSs 88 that can be stored in memory 84. The maximum number of APSs to be buffered in memory 84 may be signaled in other parameter sets, such as in a sequence parameter set or picture parameter set. Such a number can be set as a maximum number of reference frames or a maximum number of decoded pictures. Furthermore, an automatic mechanism for the APSs can be used. For example, video decoder 30 may use a sliding window based on ID values for the APSs. In this example, if the current number of stored APSs 88 in the decoder buffer (e.g., memory 84) is equal to the maximum number of APSs, the one with maximum number of ID may be removed from the buffer. In this case, the APS which is not to be used often may be assigned with a relatively larger value. In another example, video decoder 30 may remove APSs according to a first-in, first-out (FIFO) ordering mechanism. That is, the first one of stored APSs 88 to be stored into memory 84 is the first to be removed from memory 84 when it comes time to remove one of stored APSs 88 from memory 84.

In some examples, two mechanisms for assigning ID values of the APSs can be used. In some examples, ID values are always increasing for APSs. In this manner, video decoder 30 may remove the oldest received ones of stored APSs 88 after determining that one or more of stored APSs 88 should be deleted. In another example, an APS that is foreseen to be further used is assigned a relatively larger id and an APS which will not be used by pictures following the current picture in the decoding order is assigned with relatively large value. In this manner, video decoder 30 may delete stored APSs 88 having relatively larger APS ID values after determining that one or more of stored APSs 88 should be deleted.

A constraint may be added such that any APS associated with a coded picture with a temporal_id equal to a particular temporal_id (TID) will not be referenced by a picture with a temporal_id smaller than TID. Alternatively, if TID is signaled in the NAL unit header of an APS, the constraint may specify that the temporal_ID must be the same as the other VCL NAL units in its associated picture, and should not be referenced by a slice with a temporal_id smaller than the particular TID. Accordingly, video decoder 30 may decode a sub-bitstream extracted for the purpose of performing temporal scalability, without needing any additional signaling information. That is, all signaling data of an APS for slices and pictures at a particular temporal layer will be at or below that particular layer, such that video decoder 30 can be assured of receiving the APS data for those slices and pictures.

In some examples, video decoder 30 may receive data indicative of release of APS ID values. That is, this data may indicate that an APS ID value should be released, such that a new, different APS can be assigned that same APS ID value. Additionally or alternatively, video decoder 30 may be configured such that, after any random access point, all stored APSs 88 in the decoder buffer (e.g., memory 84) are cleared, i.e., discarded or otherwise removed or marked for removal from memory 84. That is, any picture with a later output or decoding order than the random access point picture may refer only to APSs associated with the current picture or the APSs associated with pictures following the random access point in decoding order. In other words, upon encountering, for example, an instantaneous decoder refresh (IDR) random access point (RAP), video decoder may clear all of stored APSs 88, and receive a new APS following the IDR RAP. In such cases, video decoder 30 may need to wait to receive the new APS prior to decoding the picture corresponding to the IDR RAP.

In some examples, a current APS can refer to a previous APS, that is, one of stored APSs 88, in the buffer (e.g., memory 84). The current APS may reuse part of the APS parameters of the one of stored APSs 88 referenced by the current APS, while the other parts of the current APS may be explicitly signaled. Moreover, a current APS may refer to two or more previous APSs that are still in the buffer, e.g., for different portions of the current APS. Various examples of APSs referring to previously stored APSs are illustrated in and described with respect to FIG. 6, as explained in detail below.

In some examples, reference picture list construction related syntax tables, including reference picture list modification and reference picture list combination can be also signaled in an APS. Thus, video decoder 30 may combine list 0 and list 1 to form a combined list based on data signaled in the APS. Similarly, decoded picture buffer management, e.g., a memory management control operation (MMCO) syntax table and/or weighted prediction table, may also be included into the APS, in some examples. Accordingly, video decoder 30 may use such data to determine when to remove pictures from reference frame memory 82, perform various MMCOs, and/or assign weights to data (e.g., pixel values of pictures) of reference frame memory 82. The weights may correspond to, for example, weighted bi-prediction, where a block is predicted from two pictures, one of which is weighted more heavily than the other. That is, when motion compensation unit 72 calculates a predicted value for a bi-predicted block, one of the two pictures may have a stronger influence on the predicted value than the other, as indicated by weights and other data indicated in the APS.

Other slice or picture level information can also be signaled in the APS, such as quantization matrices. In general, any set of information can be present or not present in the APS. That is, any set of parameters that could apply to one or more slices may be signaled in the APS. If that set is not present in a specific APS, this APS may refer to a different APS (e.g., a previously stored one of stored APSs 88) to get that set of information, and an APS may refer to multiple APSs to get different sets of information. For example, an APS may have the SAO parameters signaled, but refer to a first different APS of stored APSs 88 for the quantization matrices, refer to a second different APS of stored APSs 88 for ALF parameters, and even refer to a third APS of stored APSs 88 for decoded picture buffer management and reference picture list construction information. Accordingly, video decoder 30 may retrieve data from one or more of stored APSs 88 to decode a current slice.

In this manner, video decoder 30 represents an example of a video decoder configured to store an adaptation parameter set (APS) data structure in a buffer of a coding device, wherein the APS data structure includes signaling data applicable to one or more slices of video data, decode at least one of the slices based on the signaling data of the APS data structure, after decoding the slice, determine that the APS data structure can be removed from the buffer, remove the APS data structure from the buffer based on the determination, and decode one or more additional slices of the video data after removing the APS data structure from the buffer.

Table 1 below illustrates an example syntactic structure for a sequence parameter set (SPS) data structure. In this example, the SPS data structure signals a maximum number of APSs that are to be stored in memory 84. Although additional APSs may be stored, e.g., based on implementation of video decoder 30, this information of the SPS indicates that after the maximum number of APS data structures has been exceeded, one or more APSs may safely be discarded (cleared, removed, discarded, overwritten, marked as no longer needed, or the like) without impairing the decodability of the bitstream.

TABLE 1

| seq_parameter_set_rbsp( ) { | Descriptor |
|---|---|
| profile_idc | u(8) |
| reserved_zero_8bits /* equal to 0 */ | u(8) |
| ... | |
| aps_present_flag | u(1) |
| if (aps_present_flag) { | |
|     max_num_APSs | ue(v) |
| } | |
| rbsp_trailing_bits( ) | |
| } | |

In this example, max_num_APSs specifies the number of maximum APSs that can be buffered in the decoder buffer. MaxNumAPSs (e.g., of configuration data for video decoder 30) may be set to max_num_APSs in this case.

Table 2 below provides syntax for an APS parameter set.

TABLE 2

| aps_parameter_set_rbsp( ) { | Descriptor |
|---|---|
| aps_parameter_set_id | ue(v) |
| ref_aps_flag | u(1) |
| removal_aps_flag | u(1) |
| if ( removal_aps_flag ) { | |
| num_APS_to_remove_minus1 | ue(v) |
| for (i=0; i <= num_APS_to_remove_minus1; i++) | |
| removal_aps_id[[i] | u(1) |
| ... | |
| } | |

In this example, ref_aps_flag equal to 1 indicates that this APS is stored in the decoder memory for pictures following the current picture in decoding order. This flag equal to 0 indicates that this APS is only temporarily stored in the memory and is to be removed after the associated picture is fully decoded.

In this example, removal_aps_flag equal to 1 indicates that the current APS contains explicit signaling to remove at least one APS from the decoder buffer. This value equal to 0 indicates that the current APS does not contain explicit signaling to remove the APS from the decoder buffer. Note that even when this flag is equal to 0, it might happen that the current number of APSs in the buffer is larger than or equal to the MaxNumAPSs, with certain automatic sliding window mechanisms.

In this example, num_APS_to_remove_minus1 plus 1 indicates the number of APSs that are to be removed from the decoder buffer before (or after) the current APS is decoded.

In this example, removal_aps_id[i] specifies the APS parameter set id of the i-th APS that is to be removed from the decoder buffer.

Alternatively, a removal process may only be invoked if the current APS is to be buffered. Table 3 provides an example set of syntax for an APS in such an example:

TABLE 3

| aps_parameter_set_rbsp( ) { | Descriptor |
|---|---|
| aps_parameter_set_id | ue(v) |
| ref_aps_flag | u(1) |
| if (ref_aps_flag){ | |
| removal_aps_flag | u(1) |
| if ( removal_aps_flag ) { | |
| num_APS_to_remove_minus1 | ue(v) |
| for (i=0; i <= num_APS_to_remove_minus1; i++) | |
| removal_aps_id[[i] | u(1) |
| } | |
| ... | |
| } | |

It should be understood by indication of the ellipses in Table 3 that Table 3 represents merely a portion of the syntax elements of the APS RBSP (raw byte sequence payload). Other portions of the APS RBSP can be found in WD6 of HEVC. In still another example, delta values of the APS ids can be signaled, based on the APS id of the current APS.

Video decoder 30 may perform the following decoding process for the removal process before or after a current APS is decoded:
1. If removal_aps_flag is equal to 1, for each removal_aps_id[i] (i from 0 to num_APS_to_remove_minus1 inclusive), if the APS with an id equal to removal_aps_id[i] is in the decoder buffer, remove it.
2. If removal_aps_flag is equal to 0, identify the APS already in the decoder buffer with a maximum APS id, remove it.

Table 4 below is an example set of syntax for an APS. The syntax of Table 4 is provided as an alternative to the syntax defined in HEVC WD6.

TABLE 4

| aps_rbsp( ) { | Descriptor |
|---|---|
| aps_id | ue(v) |
| aps_sample_adaptive_offset_flag | u(1) |
| aps_adaptive_loop_filter_flag | u(1) |
| aps_reference_picture_list_construction_flag | u(1) |
| ref_aps_flag | u(1) |
| if ( ref_aps_flag ) | |
| ref_aps_id | ue(v) |
| if( aps_sample_adaptive_offset_flag || aps_adaptive_loop_filter_flag ) { | |
| aps_cabac_use_flag | u(1) |
| if( aps_cabac_use_flag ) { | |
| aps_cabac_init_idc | ue(v) |
| aps_cabac_init_qp_minus26 | se(v) |
| } | |
| } | |
| /* Insert non-CABAC stuff above this line */ | |
| if( aps_adaptive_loop_filter_flag ) { | |
| if(ref_aps_flag) | |
| reuse_alf_flag | u(1) |
| if( !reuse_alf_flag) { | |
| alf_data_byte_count /* to enable skipping past data without parsing it | u(8) |
| */ | |
| /* byte_align( ) this byte align to happen between the non-CABAC and CABAC parts of the alf_param( ) Once there is an all CABAC alf_param( ), enable this byte_align( ) */ | |
| alf_param( ) | |
| byte_align( ) | |
| } | |
| } | |

TABLE 4-continued

| aps_rbsp( ) { | Descriptor |
|---|---|
| /* insert CABAC stuff below this line; make sure its byte-aligned */ | |
|     if( aps_sample_adaptive_offset_flag ) { | |
|         if(ref_aps_flag) | |
|             reuse_sao_flag | u(1) |
|         if(! reuse_sao_flag) { | |
|             sao_data_byte_count /* to enable skipping past data without parsing it | u(8) |
| */ | |
|         byte_align ( ) | |
|             sao_param( ) | |
|         } | |
|     } | |
|     if ( aps_reference_picture_list_construction_flag) { | |
|         if (ref_aps_flag) | |
|             reuse_lists_flag | u(1) |
|         if( reuse_lists_flag) { | |
|             if( slice_type = = P | | slice_type = = B ) { | |
|                 num_ref_idx_active_override_flag | u(1) |
|                 if( num_ref_idx_active_override_flag ) { | |
|                     num_ref_idx_l0_active_minus1 | ue(v) |
|                   if( slice_type = = B ) | |
|                       num_ref_idx_l1_active_minus1 | ue(v) |
|                 } | |
|             } | |
|             ref_pic_list_modification( ) | |
|             ref_pic_list_combination( ) | |
|         } | |
|     } | |
| /* byte_align( ) this final byte align unnecessary as being taken care of by rbsp_trailing_bits( ) */ | |
|     rbsp_trailing_bits( ) | |
| } | |

Example semantics for the example of syntax data of Table 4 are provided below. Specifically, semantics are provided for the elements of the APS RBSP that differ with respect to the APS RBSP defined in HEVC WD6. Semantics for other syntax elements not discussed below may remain the same as defined in HEVC WD6. In this example, aps_reference_picture_list_construction_flag equal to 1 may indicate that whether the reference picture list construction related syntax elements is signaled in the current APS. This flag equal to 0 may indicate that those syntax elements are signaled in the slice header.

In this example, ref_aps_flag_equal to 1 may indicate that part of the APS parameters may be the same as a previous reference APS and are not signaled. This value equal to 0 may indicate that the APS doesn't refer to a previous APS with an id of ref_aps_id.

In this example, reuse_alf_flag equal to 1 may indicate that the ALF parameters of this APS are the same as those of the reference APS with an id of ref_aps_id. This value equal to 0 may indicate that the ALF parameters are signaled in this APS. When not present, reuse_alf_flag is inferred to be 0.

In this example, reuse_sao_flag equal to 1 may indicate that the SAO parameters of this APS are the same as those of the reference APS with an id of ref_aps_id. This value equal to 0 may indicate that the SAO parameters are signaled in this APS. When not present, reuse_sao_flag may be inferred to be 0.

In this example, reuse_lists_flag equal to 1 may indicate that the reference picture lists related syntax elements of this APS are the same as those of the reference APS with an id of ref_aps_id. This value equal to 0 may indicate that the elements are signaled in this APS. When not present, reuse_lists_flag is inferred to be 0.

In some examples, slice headers may be modified to reflect the data signaled by APS data structures. For example, Table 5 below provides an example slice header in accordance with the techniques of this disclosure.

TABLE 5

| slice_header( ) { | Descriptor |
|---|---|
|     lightweight_slice_flag | u(1) |
|     if( !lightweight_slice_flag ) { | |
|         slice_type | ue(v) |
|         pic_parameter_set_id | ue(v) |
|         if( sample_adaptive_offset_enabled_flag || adaptive_loop_filter_enabled_flag|| ref_const_in_aps_flag) | |
|             aps_id | |
|         frame_num | u(v) |
|         if( IdrPicFlag ) | |
|             idr_pic_id | ue(v) |
|         if( pic_order_cnt_type = = 0 ) | |
|             pic_order_cnt_lsb /* | u(v) |
|         if(!ref_const_in_aps_flag && !aps_reference_picture_list_construction_flag) | |
|     { | |

TABLE 5-continued

| slice_header( ) { | Descriptor |
|---|---|
|     if( slice_type = = P \|\| slice_type = = B ) { | |
|         num_ref_idx_active_override_flag | u(1) |
|         if( num_ref_idx_active_override_flag ) { | |
|             num_ref_idx_l0_active_minus1 | ue(v) |
|             if( slice_type = = B ) | |
|                 num_ref_idx_l1_active_minus1 | ue(v) |
|         } | |
|     } | |
|     ref_pic_list_modification( ) | |
|     ref_pic_list_combination( ) | |
|   } | |
|   if(nal_ref_idc != 0 ) | |
|     dec_ref_pic_marking( ) | |
| } | |
| if( entropy_coding_mode_flag && slice_type != I) | |
|   cabac_init_idc | ue(v) |
| first_slice_in_pic_flag | u(1) |
| if( first_slice_in_pic_flag == 0 ) | |
|   slice_address | u(v) |
| if( !lightweight_slice_flag ) { | |
|   slice_qp_delta | se(v) |
|   if( deblocking_filter_control_present_flag ) { | |
|     disable_deblocking_filter_idc | |
|     if( disable_deblocking_filter_idc != 1 ) { | |
|       slice_alpha_c0_offset_div2 | |
|       slice_beta_offset_div2 | |
|     } | |
|   } | |
|   if( slice_type = = B ) | |
|     collocated_from_l0_flag | u(1) |
|   if( adaptive_loop_filter_enabled_flag && aps_adaptive_loop_filter_flag ) { | |
|   byte_align( ) | |
|     alf_cu_control_param( ) | |
|   byte_align( ) | |
|   } | |
| } | |

In some examples, ref_const_in_aps_flag is a flag signaled, either in the PPS or SPS, to indicate whether the reference picture lists related syntax elements can be signaled in APS.

Figure 4:
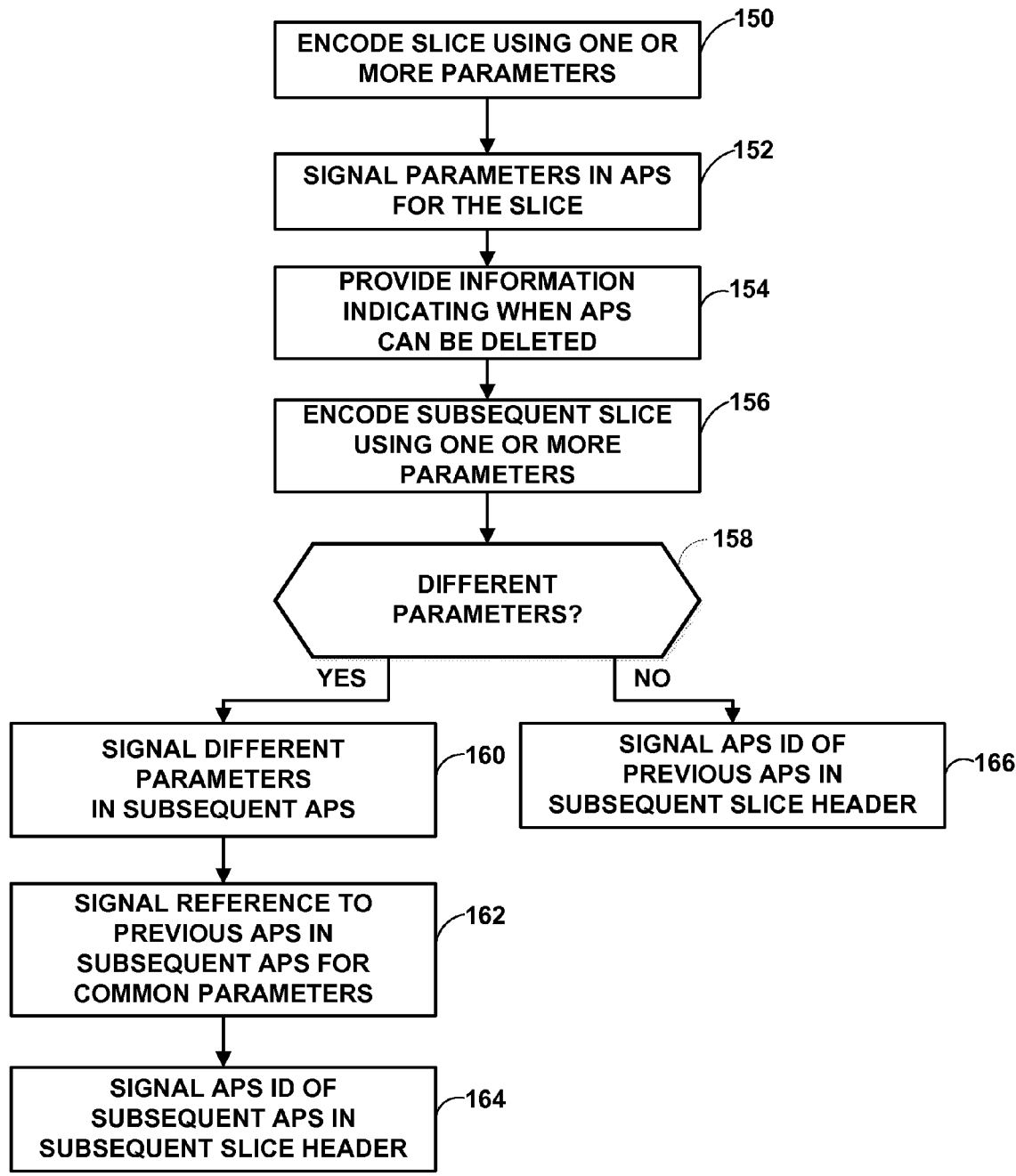
FIG. 4 is a flowchart illustrating an example method for encoding video data using an APS data structure.

FIG. 4 is a flowchart illustrating an example method for encoding video data using an APS data structure. Although explained with respect to the example of video encoder 20, it should be understood that the method of FIG. 4 may be performed by other video encoding devices as well, such as transcoders. Moreover, certain steps of the method may be omitted or performed in a different order, or in parallel.

Initially, video encoder 20 may encode a slice using one or more parameters (150). The parameters may include one or more of ALF coefficients, SAO parameters, picture list modification data, reference picture list combination data, memory management control operation syntax data, weighted prediction tables, and/or quantization matrices, or other such data. Video encoder 20 may further signal any or all of the parameters in an APS data structure (152). In some examples, one or more of the parameters of the APS may refer to one or more previous APSs, assuming that the previous APSs were previously output into the bitstream and are assumed to be stored in the video decoder buffer.

Video encoder 20 may further provide information indicating when the APS can be deleted (154). This may occur prior to encoding the slice and sending the APS, or after encoding the slice and sending the APS. For example, video encoder 20 may signal a flag or other syntax element in a subsequent APS indicating that the APS signaled in step 152 can be deleted, as discussed above. Alternatively, video encoder 20 may signal a maximum number of APSs to be stored in a video decoder buffer, e.g., in an SPS data structure. In some examples, the information may be implicit, e.g., by providing an indication that a subsequently coded picture is a random access point (RAP).

Video encoder 20 may further encode a subsequent slice using one or more parameters (156). These parameters may differ from the parameters used to encode the slice of step 150. Alternatively, the parameters may be the same as the parameters used to encode the slice of step 150, e.g., when the APS signaled in step 152 is assumed to be deleted (e.g., following a random access point). Accordingly, video encoder 20 may determine whether to use different parameters to encode the subsequent slice (158). If video encoder 20 did not use different parameters to encode the subsequent slice ("NO" branch of 158), video encoder 20 may signal the APS ID of the previous APS in the slice header of the subsequent slice (166). On the other hand, if video encoder 20 used one or more different parameters to encode the subsequent slice ("YES" branch of 158), video encoder 20 may signal the different parameters in a subsequent APS (160).

Video encoder 20 may also signal a reference to a previous APS in the subsequent APS for common parameters (162), that is, parameters that were used to encode the previous slice signaled in the previous APS and parameters that were used to encode the subsequent slice. Moreover, video encoder 20 may signal an APS ID value of the subsequent APS in the subsequent slice header (164). Additionally or alternatively, the subsequent APS may refer to two or more previous APSs, e.g., for different portions of the subsequent APS. The APS signaled in step 152 and/or the subsequent APS of set 158 may apply to one or more slices, and the one or more slices may refer to one or more APSs. In addition, as discussed above, video encoder 20 may provide an indication in the subsequent APS that one or more previous APSs can be deleted, if they are no longer needed. In some alternative examples, video encoder 20 may simply provide all of the parameters in the subsequent APS, rather than providing a reference to the previous APS for common parameters.

In this manner, the method of FIG. 4 represents an example of a method including encoding a first set of one or more slices of video data using one or more parameters, signaling the one or more parameters in an APS data structure, and encoding a second set of one or more slices of the video data following a determined slice of the first set of one or more slices without reference to the APS data structure.

Figure 5:
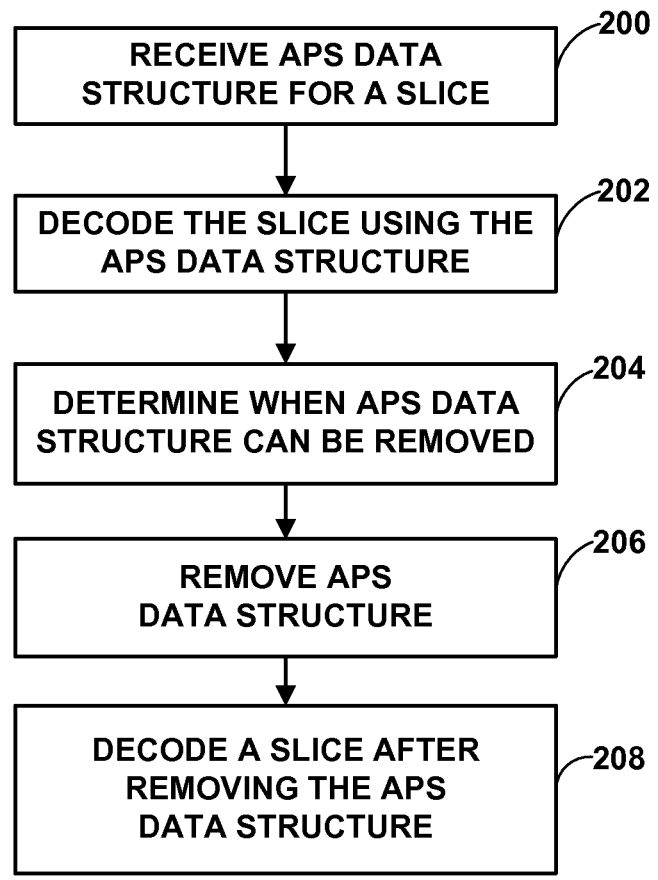
FIG. 5 is a flowchart illustrating an example method for decoding video data using an APS data structure.

FIG. 5 is a flowchart illustrating an example method for decoding video data using an APS data structure. Although describe with respect to video decoder 30 for purposes of explanation, it should be understood that other video decoding devices may also perform a similar method. Likewise, the steps of the method may be performed in a different order, or in parallel, and certain steps may be omitted.

Video decoder 30 may receive an APS data structure for a slice, where the APS data structure signals one or more parameters for the slice (200). In some examples, the APS data structure signals parameters for a plurality of slices. Video decoder 30 may decode at least one of the slices using the APS data structure (202), e.g., using parameters signaled in the APS data structure. These parameters may include, for example, ALF coefficients, SAO parameters, reference picture list modification data, reference picture list combination data, memory management control operation syntax data, weighted prediction tables, and/or quantization matrices, or other additional or alternative data that may be common to a plurality of slices or pictures. As discussed above, an APS may include references to other, previously stored APSs, such that video decoder 30 may decode a slice using data of one or more stored APSs, e.g., stored APSs 88. Video decoder 30 may also determine when the APS data structure can be removed (204), e.g., using any of the techniques described above, such as flags included in APS data structures, receipt of a subsequent APS, a signaled or otherwise determined maximum numbers of APSs to be stored in memory 84, explicit indications of APSs to be removed, or other techniques as described above.

Based on the determination that the APS can be removed, video decoder 30 may remove the APS data structure (206). Video decoder 30 need not necessarily remove the APS data structure immediately upon determining that the APS data structure can be removed, but may simply mark the APS data structure as no longer needed and delete the APS data structure during a garbage collection process, in some examples. Video decoder 30 may remove one or more APS data structures from memory 84 (208) before decoding a slice of the same video sequence.

In this manner, the method of FIG. 5 represents an example of a method including storing an APS data structure in a buffer of a coding device, wherein the APS data structure includes signaling data applicable to one or more slices of video data, decoding at least one of the slices based on the signaling data of the APS data structure, after decoding the slice, determining that the APS data structure can be removed from the buffer, removing the APS data structure from the buffer based on the determination, and decoding one or more additional slices of the video data after removing the APS data structure from the buffer.

Figure 6:
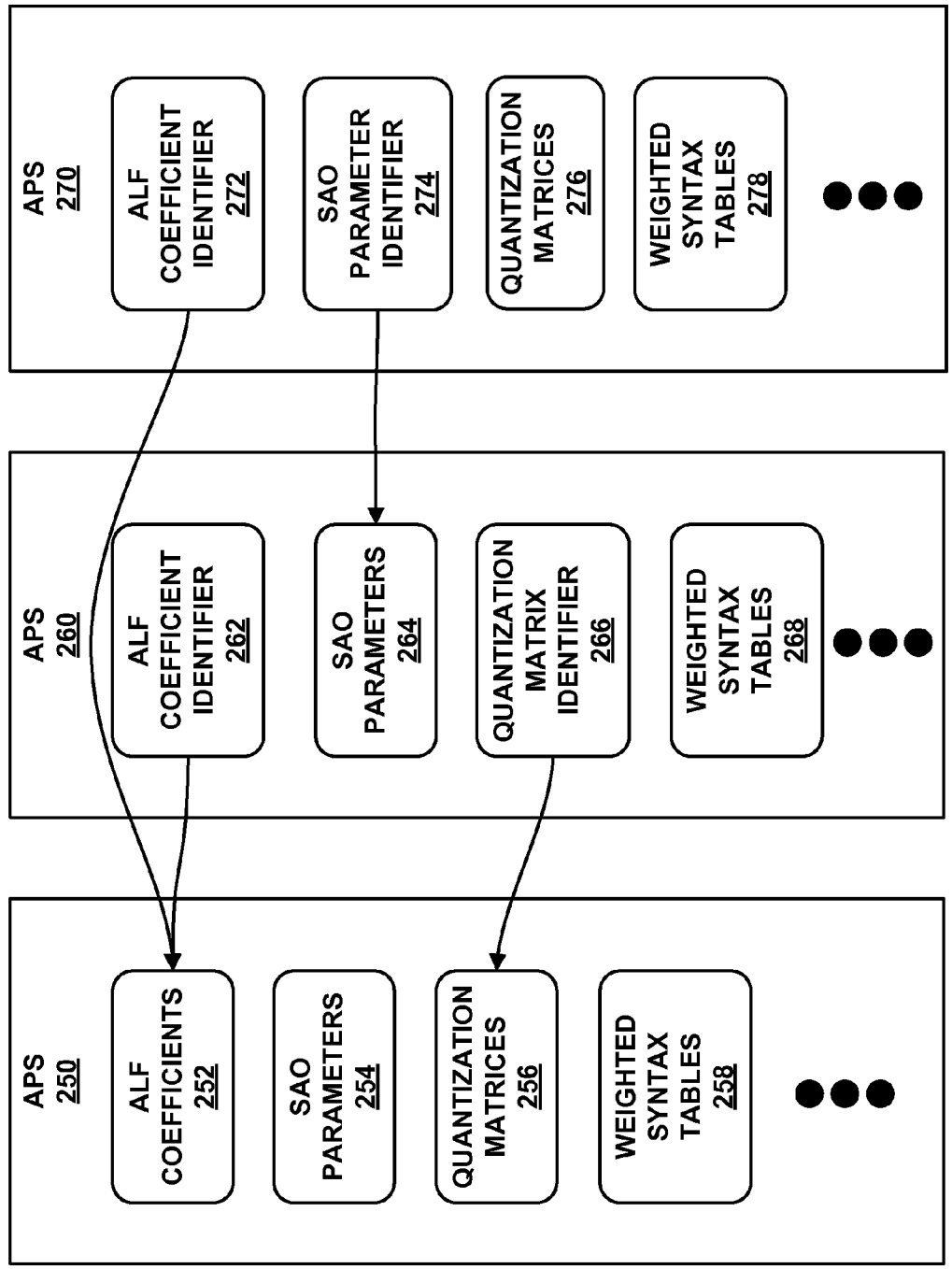
FIG. 6 is a conceptual diagram illustrating various examples of APS data structures.

FIG. 6 is a conceptual diagram illustrating APS data structures 250, 260, and 270. In this example, APS data structure 250 includes ALF coefficients 252, SAO parameters 254, quantization matrices 256, and weighted syntax tables 258, among other possible data as indicated by ellipses. Accordingly, video encoder 20 may have encoded a slice (not shown) using data of ALF coefficients 252, SAO parameters 254, quantization matrices 256, and weighted syntax tables 258. Thus, video encoder 20 may construct APS 250 after determining values for ALF coefficients 252, SAO parameters 254, quantization matrices 256, and weighted syntax tables 258 used to code the slice. Video encoder 20 may also assign an ID value (not shown) to APS 250, and may construct a header for the slice including a reference to the APS ID of APS 250.

In this manner, video decoder 30 may receive APS 250 and a coded slice including a reference to the APS ID of APS 250. Thus, video decoder 30 may decode the slice using ALF coefficients 252, SAO parameters 254, quantization matrices 256, and weighted syntax tables 258 of APS 250, based on the APS ID signaled in the slice header.

Subsequently, video encoder 20 may encode a slice using different SAO parameters and different weighted syntax tables, but using the same ALF coefficients and the same quantization matrices. Accordingly, video encoder 20 may construct a different APS, e.g., APS 260, to signal the different parameters, but include references to the parameters of APS 250 (a previous APS, in this example) such that this data does not need to be reproduced in the different APS. In this example, APS 260 includes ALF coefficient identifier 262, SAO parameters 264, quantization matrix identifier 266, and weighted syntax tables 268. ALF coefficient identifier 262 refers to ALF coefficients 252 of APS 250, and quantization matrix identifier 266 refers to quantization matrices 256 of APS 250, as indicated by arrows in FIG. 6. Video encoder 20 may further assign APS 260 a separate APS ID value, and signal this APS ID value in the slice header of the slice.

Accordingly, video decoder 30 may receive data for APS 260, and the slice. Based on the APS ID value of the slice, referring to APS 260, video decoder 30 may decode the slice using data of APS 260. When performing adaptive loop filtering, video decoder 30 may determine that ALF coefficient identifier 262 of APS 260 refers to ALF coefficients 252. Accordingly, video decoder 30 may retrieve ALF coefficients 252 of APS 250 to perform adaptive loop filtering for the slice. When performing sample adaptive offsets, video decoder 30 may retrieve data from SAO parameters 264 of APS 260. When performing quantization, video decoder 30 may determine that quantization matrix identifier 266 refers to quantization matrices 256 of APS 250, and therefore, may retrieve data of quantization matrices 256 of APS 250. Moreover, when performing weighting, video decoder 30 may retrieve data for weighted syntax tables 268 of APS 260.

Subsequently, video encoder 20 may encode a slice using the same ALF coefficients as signaled in APS 250, the same SAO parameters as signaled in APS 260, and new quantization matrices and weighted syntax tables. Accordingly, video encoder 20 may construct APS 270 to include ALF coefficient identifier 272, referring to ALF coefficients 252 of APS 250, SAO parameter identifier 274, referring to SAO parameters 264, quantization matrices 276, and weighted syntax tables 278. In this manner, APS 270 represents an example of an APS that refers to two separate APSs for various parameters to be signaled. Video encoder 20 may further signal an APS ID value for APS 270 in the slice header of the slice.

Video decoder 30 may receive data for APS 270 and the slice. Based on the APS ID of the slice header, video decoder 30 may determine that parameters signaled in APS 270 are to be used to decode the slice. When performing adaptive loop filtering, video decoder 30 may determine that ALF coefficient identifier 272 of APS 270 refers to ALF coefficients 252. Accordingly, video decoder 30 may retrieve ALF coefficients 252 of APS 250 to perform adaptive loop filtering for the slice. When performing sample adaptive offsets, video decoder 30 may determine that SAO parameter identifier 274 refers to SAO parameters 264. Accordingly, video decoder 30 may retrieve data from SAO parameters 264 of APS 260. When performing quantization, video decoder 30 may retrieve data of quantization matrices 276 of APS 270. Moreover, when performing weighting, video decoder 30 may retrieve data for weighted syntax tables 278 of APS 270.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   receiving an adaptation parameter set (APS) data structure in an encoded video stream, the received APS data structure including a syntax element indicating an identifier of the received APS data structure, the received APS data structure including data representative of one or more sample adaptive offset (SAO) parameters for a plurality of slices associated with the received APS data structure, wherein each of the plurality of slices associated with the received APS data structure signals the identifier of the received APS data structure;
   storing the received APS data structure in a buffer, wherein the received APS data structure includes signaling data applicable to the plurality of slices;
   decoding the plurality of slices based on the signaling data of the received APS data structure;
   receiving information indicating a maximum number of APS data structures that can be stored in the buffer;
   after decoding the plurality of slices, determining, based on the information, that the buffer contains the maximum number of APS data structures;
   removing the received APS data structure from the buffer based on the determination; and
   decoding one or more additional slices of the video data after removing the received APS data structure from the buffer.

2. The method of claim 1, wherein the received APS data structure includes data representative of quantization matrices for the plurality of slices.

3. The method of claim 2, wherein the received APS data structure is a first received APS data structure, the first received APS data structure comprises a set of data, and the plurality of slices is a first plurality of slices,
   the method further comprising decoding a second set of one or more slices using the set of data of the first received APS without retrieving the set of data from a second received APS data structure applicable to the second set of one or more slices.

4. The method of claim 3, wherein the set of data comprises adaptive loop filter (ALF) coefficients.

5. The method of claim 1, wherein the received APS data structure includes data representative of one or more of ALF coefficients for the plurality of slices.

6. The method of claim 1, wherein the received APS data structure includes data representative of one or more of picture list modification data, reference picture list combination data, memory management control operation syntax data, and weighted prediction tables for the plurality of slices.

7. The method of claim 1, wherein the received APS data structure is a first received APS data structure, the method further comprising:
receiving a second APS data structure, wherein the second received APS data structure includes information indicating that at least a portion of the second received APS data structure refers to a corresponding portion of the first received APS data structure; and
decoding a slice associated with the second received APS data structure using data of the portion of the first received APS data structure based on the information of the second received APS data structure.

8. The method of claim 7, further comprising:
receiving a third APS data structure, wherein the third received APS data structure includes information indicating that a first portion of the third received APS data structure refers to a corresponding portion of the first received APS data structure and that a second, different portion of the third received APS data structure refers to a corresponding portion of the second received APS data structure; and
decoding a slice associated with the third received APS data structure using data of the portion of the first received APS data structure and data of the portion of the second received APS data structure based on the information of the third received APS data structure.

9. A device for decoding video data, the device comprising:
a memory comprising a buffer; and
a video decoder configured to:
receive an adaptation parameter set (APS) data structure, the received APS data structure including a syntax element indicating an identifier of the received APS data structure, the received APS data structure including data representative of one or more sample adaptive offset (SAO) parameters for a plurality of slices associated with the received APS data structure, wherein each of the plurality of slices associated with the received APS data structure signals the identifier of the received APS data structure;
store the received APS data structure in the buffer, wherein the received APS data structure includes signaling data applicable to the plurality of slices;
decode the plurality of slices based on the signaling data of the received APS data structure;
receive information indicating a maximum number of APS data structures that can be stored in the buffer;
after decoding the plurality of slices, determine, based on the information, that the buffer contains the maximum number of APS data structures;
remove the received APS data structure from the buffer based on the determination; and
decode one or more additional slices of the video data after removing the received APS data structure from the buffer.

10. The device of claim 9, wherein the received APS data structure includes data representative of quantization matrices for the plurality of slices.

11. The device of claim 9, wherein the received APS data structure is a first received APS data structure, the first received APS data structure comprises a set of data, and the plurality of slices is a first plurality of slices,
wherein the video decoder is further configured to decode a second set of one or more slices using the set of data of the first received APS without retrieving the set of data from a second received APS data structure applicable to the second set of one or more slices.

12. The device of claim 11, wherein the set of data comprises adaptive loop filter (ALF) coefficients.

13. The device of claim 9, wherein the received APS data structure comprises a first received APS data structure, and the video decoder is configured to receive a second received APS data structure, wherein the second received APS data structure includes information indicating that at least a portion of the second received APS data structure refers to a corresponding portion of the first received APS data structure,
wherein the video decoder is further configured to decode a slice associated with the second received APS data structure using data of the portion of the first received APS data structure based on the information of the second received APS data structure.

14. A device for decoding video data, the device comprising:
means for receiving an adaptation parameter set (APS) data structure in an encoded video bitstream, the received APS data structure including a syntax element indicating an identifier of the received APS data structure, the received APS data structure including data representative of one or more sample adaptive offset (SAO) parameters for a plurality of slices associated with the received APS data structure, wherein each of the plurality of slices associated with the received APS data structure signals the identifier of the received APS data structure;
means for storing the received APS data structure in a buffer, wherein the received APS data structure includes signaling data applicable to the plurality of slices;
means for decoding the plurality of slices based on the signaling data of the received APS data structure;
means for receiving information indicating a maximum number of APS data structures that can be stored in the buffer;
means for after decoding the plurality of slices, determining, based on the information, that the buffer contains the maximum number of APS data structures;
means for removing the received APS data structure from the buffer based on the determination; and
means for decoding one or more additional slices of the video data after removing the received APS data structure from the buffer.

15. The device of claim 14, wherein the received APS data structure includes data representative of quantization matrices for the plurality of slices.

16. The device of claim 14, wherein the received APS data structure is a first received APS data structure, the first received APS data structure comprises a set of data, and the plurality of slices is a first plurality of slices, the device comprising means for decoding a second set of one or more slices using the set of data of the first received APS without retrieving the set of data from a second received APS data structure applicable to the second set of one or more slices.

17. The device of claim 15, wherein the set of data comprises adaptive loop filter (ALF) coefficients.

18. The device of claim 14, wherein the received APS data structure is a first APS data structure, the device comprising:
means for receiving a second APS data structure, wherein the second received APS data structure includes information indicating that at least a portion of the second received APS data structure refers to a corresponding portion of the first received APS data structure; and means for decoding a slice associated with the second received APS data structure using data of the portion of the first received APS data structure based on the information of the second received APS data structure.

19. A non-transitory computer-readable storage medium having stored thereon instructions that, when executed, cause a processor to:

receive an adaptation parameter set (APS) data structure, the received APS data structure including a syntax element indicating an identifier of the received APS data structure, the received APS data structure including data representative of one or more sample adaptive offset (SAO) parameters for a plurality of slices associated with the received APS data structure, wherein each of the plurality of slices associated with the received APS data structure signals the identifier of the received APS data structure;

store the received APS data structure in a buffer, wherein the received APS data structure includes signaling data applicable to the plurality of slices;

decode the plurality of slices based on the signaling data of the received APS data structure;

receive information indicating a maximum number of APS data structures that can be stored in the buffer;

after decoding the plurality of slices, determine, based on the information, that the buffer contains the maximum number of APS data structures;

remove the received APS data structure from the buffer based on the determination; and decode one or more additional slices of video data after removing the received APS data structure from the buffer.

20. The non-transitory computer-readable storage medium of claim 19, wherein the received APS data structure includes data representative of quantization matrices for the plurality of slices.

21. The non-transitory computer-readable storage medium of claim 19, wherein the received APS data structure is a first received APS data structure, the first received APS data structure comprises a set of data, and the plurality of slices is a first plurality of slices, further comprising instructions that cause the processor to decode a second set of one or more slices using the set of data of the first received APS without retrieving the set of data from a second received APS data structure applicable to the second set of one or more slices.

22. The non-transitory computer-readable storage medium of claim 21, wherein the set of data comprises adaptive loop filter (ALF) coefficients.

23. The non-transitory computer-readable storage medium of claim 19, wherein the received APS data structure comprises a first received APS data structure, wherein the instructions cause the processor to:

receive a second received APS data structure, wherein the second received APS data structure includes information indicating that at least a portion of the second received APS data structure refers to a corresponding portion of the first APS data structure; and decode a slice associated with the second received APS data structure using data of the portion of the first received APS data structure based on the information of the second received APS data structure.

24. A method of encoding video data, the method comprising:

signaling one or more parameters in an adaptation parameter set (APS) data structure, the APS data structure including a syntax element indicating an identifier of the APS data structure, the one or more parameters in the APS data structure including one or more sample adaptive offset (SAO) parameters for a first plurality of slices of the video data;

encoding, using the one or more parameters, the first plurality of slices of the video data, each slice of the first plurality of slices specifying the identifier of the APS data structure;

encoding, without reference to the APS data structure, a second plurality of slices of the video data; and providing information indicating a maximum number of APS data structures that can be stored in a buffer.

25. The method of claim 24, wherein the one or more parameters signaled in the APS data structure include one or more quantization matrices for the first plurality of slices.

26. The method of claim 24, wherein the one or more parameters signaled in the APS data structure include one or more of adaptive loop filter (ALF) coefficients.

27. The method of claim 24, wherein the one or more parameters signaled in the APS data structure include one or more of picture list modification data, reference picture list combination data, memory management control operation syntax data, and weighted prediction tables for the first plurality of slices.

28. The method of claim 24, wherein the APS data structure is a first APS data structure, the method further comprising:

encoding a slice of the video data using the one or more parameters signaled in the first APS data structure and one or more parameters not signaled in the first APS data structure;

signaling the one or more parameters not signaled in the first APS data structure in a second APS data structure; and providing information in the second APS data structure indicating that a portion of the second APS data structure refers to a corresponding portion of the first APS data structure, wherein the corresponding portion comprises the one or more parameters signaled in the first APS data structure used to encode the slice.

29. The method of claim 28, further comprising assigning the first APS data structure a priority value that is lower than priority values of subsequent APS data structures.

30. A device for encoding video data, the device comprising:

a data storage medium configured to store the video data; and a video encoder configured to:

signal one or more parameters in an adaptation parameter set (APS) data structure, the APS data structure including a syntax element indicating an identifier of the APS data structure, the one or more parameters in the APS data structure including data representative of one or more sample adaptive offset (SAO) parameters for a first plurality of slices of the video data;

encode, using the one or more parameters, the first plurality of slices of the video data, each slice of the first plurality of slices specifying the identifier of the APS data structure;

encode, without reference to the APS data structure, a second plurality of slices of the video data; and provide information indicating a maximum number of APS data structures that can be stored in a buffer.

31. The device of claim 30, wherein the one or more parameters signaled in the APS data structure include one or more quantization matrices for the first plurality of slices.

32. The device of claim 30, wherein the one or more parameters signaled in the APS data structure include one or more of adaptive loop filter (ALF) coefficients, picture list modification data, reference picture list combination data, memory management control operation syntax data, weighted prediction tables, and quantization matrices.

33. The device of claim 30, wherein the APS data structure is a first APS data structure, wherein the video encoder is further configured to:
    encode a slice of the video data using the one or more parameters signaled in the first APS data structure and one or more parameters not signaled in the first APS data structure;
    signal the one or more parameters not signaled in the first APS data structure in a second APS data structure; and
    provide information in the second APS data structure indicating that a portion of the second APS data structure refers to a corresponding portion of the first APS data structure, wherein the corresponding portion comprises the one or more parameters signaled in the first APS data structure used to encode the slice.

34. A device for encoding video data, the device comprising:
    means for signaling one or more parameters in an adaptation parameter set (APS) data structure, the APS data structure including a syntax element indicating an identifier of the APS data structure, the one or more parameters in the APS data structure including data representative of one or more sample adaptive offset (SAO) parameters for a first plurality of slices of the video data;
    means for encoding, using the one or more parameters, a first plurality of slices of the video data, each slice of the first plurality of slices specifying the identifier of the APS data structure;
    means for encoding, without reference to the APS data structure, a second plurality of slices of the video data; and
    means for providing information indicating a maximum number of APS data structures that can be stored in a buffer.

35. The device of claim 34, wherein the one or more parameters signaled in the APS data structure include one or more quantization matrices for the first plurality of slices.

36. The device of claim 34, wherein the one or more parameters signaled in the APS data structure include one or more of adaptive loop filter (ALF) coefficients, picture list modification data, reference picture list combination data, memory management control operation syntax data, weighted prediction tables, and quantization matrices.

37. The device of claim 34, wherein the APS data structure is a first APS data structure, the device comprising:
    means for encoding a slice of the video data using one or more parameters signaled in the first APS data structure and one or more parameters not signaled in the first APS data structure;
    means for signaling the one or more parameters not signaled in the first APS data structure in a second APS data structure; and
    means for providing information in the second APS data structure indicating that a portion of the second APS data structure refers to a corresponding portion of the first APS data structure, wherein the corresponding portion comprises the one or more parameters signaled in the first APS data structure used to encode the slice.

38. A non-transitory computer-readable storage medium having stored thereon instructions that, when executed, cause a processor to:
    signal one or more parameters in an adaptation parameter set (APS) data structure, the APS data structure including a syntax element indicating an identifier of the APS data structure, the one or more parameters in the APS data structure including data representative of one or more sample adaptive offset (SAO) parameters for a first plurality of slices of the video data;
    encode, using the one or more parameters, a first plurality of slices of video data, each slice of the first plurality of slices specifying the identifier of the APS data structure;
    encode, without reference to the APS data structure, a second plurality of slices of the video data; and
    provide information indicating a maximum number of APS data structures that can be stored in a buffer.

39. The non-transitory computer-readable storage medium of claim 38, wherein the one or more parameters signaled in the APS data structure include one or more quantization matrices for the first plurality of slices.

40. The non-transitory computer-readable storage medium of claim 38, wherein the one or more parameters signaled in the APS data structure include one or more of adaptive loop filter (ALF) coefficients, picture list modification data, reference picture list combination data, memory management control operation syntax data, weighted prediction tables, and quantization matrices.

41. The non-transitory computer-readable storage medium of claim 38, wherein the APS data structure is a first APS data structure, further comprising instructions that cause the processor to:
    encode a slice of the video data using the one or more parameters signaled in the first APS data structure and one or more parameters not signaled in the first APS data structure;
    signal the one or more parameters not signaled in the first APS data structure in a second APS data structure; and
    provide information in the second APS data structure indicating that a portion of the second APS data structure refers to a corresponding portion of the first APS data structure, wherein the corresponding portion comprises the one or more parameters signaled in the first APS data structure used to encode the slice.

42. The device of claim 9, wherein the device is a wireless communication device, further comprising a receiver configured to:
    receive the APS data structure; and
    receive the information indicating the maximum number of APS data structures that can be stored in the buffer.

43. The device of claim 42, wherein the wireless communication device is a cellular telephone and the APS data structure is received by the receiver and demodulated according to a wireless communication standard.

44. The device of claim 30, wherein the device is a wireless communication device, further comprising a transmitter configured to transmit the APS data structure.

45. The device of claim 44, wherein the wireless communication device is a cellular telephone and the APS data structure is transmitted by the transmitter and modulated according to a wireless communication standard.

* * * * *